US008646080B2

(12) United States Patent
Williamson et al.

(10) Patent No.: US 8,646,080 B2
(45) Date of Patent: Feb. 4, 2014

(54) METHOD AND APPARATUS FOR REMOVING HARMFUL SOFTWARE

(75) Inventors: Matthew Williamson, Palo Alto, CA (US); Vladimir Gorelik, Palo Alto, CA (US)

(73) Assignee: AVG Technologies CY Limited (NL)

( * ) Notice: Subject to any disclaimer, the term of this patent is extended or adjusted under 35 U.S.C. 154(b) by 1961 days.

(21) Appl. No.: 11/229,013

(22) Filed: Sep. 16, 2005

(65) Prior Publication Data
US 2007/0067843 A1    Mar. 22, 2007

(51) Int. Cl.
*G06F 12/14* (2006.01)

(52) U.S. Cl.
USPC .................................. 726/24; 726/22; 726/23

(58) Field of Classification Search
None
See application file for complete search history.

(56) References Cited

U.S. PATENT DOCUMENTS

| | | | |
|---|---|---|---|
| 5,649,095 A | 7/1997 | Cozza | |
| 6,711,583 B2 | 3/2004 | Chess et al. | |
| 6,944,772 B2 * | 9/2005 | Dozortsev | 713/180 |
| 7,017,155 B2 | 3/2006 | Peev et al. | |
| 7,093,239 B1 * | 8/2006 | van der Made | 717/135 |
| 7,328,456 B1 | 2/2008 | Szor et al. | |
| 8,397,297 B2 * | 3/2013 | Williamson et al. | 726/23 |
| 2002/0178375 A1 | 11/2002 | Whittaker et al. | |
| 2002/0194490 A1 | 12/2002 | Halperin et al. | |
| 2003/0023875 A1 | 1/2003 | Hursey et al. | |
| 2003/0065926 A1 * | 4/2003 | Schultz et al. | 713/188 |
| 2003/0074567 A1 | 4/2003 | Charbonneau | |
| 2003/0074578 A1 | 4/2003 | Ford et al. | |
| 2003/0120935 A1 | 6/2003 | Teal et al. | |
| 2003/0167402 A1 | 9/2003 | Stolfo et al. | |
| 2003/0204569 A1 | 10/2003 | Andrews et al. | |
| 2004/0073810 A1 | 4/2004 | Dettinger et al. | |
| 2004/0153644 A1 | 8/2004 | McCorkendale et al. | |
| 2004/0187023 A1 | 9/2004 | Alagna et al. | |
| 2004/0210796 A1 * | 10/2004 | Largman et al. | 714/20 |
| 2005/0027686 A1 | 2/2005 | Shipp | |
| 2005/0080855 A1 | 4/2005 | Murray | |
| 2005/0086499 A1 | 4/2005 | Hoefelmeyer et al. | |
| 2005/0132206 A1 | 6/2005 | Palliyil et al. | |
| 2005/0132358 A1 | 6/2005 | Peev et al. | |
| 2005/0155031 A1 | 7/2005 | Wang et al. | |
| 2005/0187740 A1 | 8/2005 | Marinescu | |
| 2005/0188272 A1 | 8/2005 | Bodorin et al. | |
| 2006/0021041 A1 | 1/2006 | Challener et al. | |
| 2006/0123244 A1 | 6/2006 | Gheorghescu et al. | |

OTHER PUBLICATIONS

Wagner "Behavior Oriented Detection of Malicious Code at Run-Time", a thesis submitted to the College of Engineering at Florida Institute of Technology, May 2004, consisting of 88 pages.
Security Innovation, "Gatekeeper II, New Approaches to Generic Virus Protection", 2003, consisting of 19 pages.
El Far et al. "On the Impact of Short-Term Email Message Recall on the Spread of Malware", EICAR 2005 Conference: Best Paper Proceedings, pp. 175-189.
"Gatekeeper II: New Approaches to Generic Virus Prevention" Virus Bulletin Conference, Sep. 29-Oct. 1, 2004, consisting of 11 pages.

* cited by examiner

*Primary Examiner* — Kaveh Abrishamkar
(74) *Attorney, Agent, or Firm* — Pepper Hamilton LLP

(57) ABSTRACT

Embodiments of the invention address the problem of removing malicious code from infected computers.

26 Claims, 5 Drawing Sheets

METHOD AND APPARATUS FOR REMOVING HARMFUL SOFTWARE

BACKGROUND

Malicious programs, or malware, fall into many categories. Trojans or backdoors provide remote access to the machine across the network. Spyware attempts to log information (e.g. browsing habits, logins, passwords) and then transmit that information to a third party, who can use that information for personal gain. Other programs such as worms or viruses cause damage by self-replicating amongst machines. Malware causes considerable damage to enterprises, measured in loss of information, brand, and computer administration costs.

Malware often evades detection by stealth. Malware also evades removal by actively resisting removal, or by being so complicated that it is difficult to remove all traces of the malware.

One common methodology for malware removal is signature based. Companies obtain samples of the malware, (either from their customers, or by scanning the Internet for the malware), analyze the code and generate a "signature" and a cleanup script. The signature is generally a list of unique identifiers of the executables involved, such as a hash of all or part of the executable image on disc. A hash is a compact, unique representation of the data in the file, with the property that different executables will result in different hashes. The signature can also include lists of other pieces of data associated with the malware, for example configuration files and configuration data written in the configuration database on the computer. On the Windows operating system, this database is called the registry. The registry contains a large proportion of the configuration data for the computer, for example specifying which programs survive reboot. The cleanup script is a list of processes to kill, programs to remove from the filesystem, and configuration data to delete or restore to default values. Cleaning is an example of removing.

Unfortunately, this signature-based approach has some significant problems. The first problem is that it is easy for the signature to be out of date. Malware on infected machines is often connected to the Internet and can easily update or morph itself, making the malware on the infected machine different from the sample analyzed at the security vendor's laboratory. The malware on the infected machine evades detection attempts based on the signature which was developed from the analyzed sample. This results in incomplete and unsatisfactory removal of the malware.

Second, malware is easily customized to each machine, for example by choosing a random file name. This machine-specific customization makes each individual infection different from the malware analyzed in the laboratory, and again results in incomplete and unsatisfactory removal.

Third, malware programs can actively resist removal, for example by having two programs that watch and restart each other should one be killed, or by loading themselves into system processes, thereby locking the executable so that the executable cannot be deleted. In another example, the configuration data is automatically monitored by malware, which rewrites any changes made to the configuration data. The removal program has to run with sufficient privileges to guarantee control over user mode process and provide an avenue to deal with kernel mode malware, preferably in the kernel of the operating system. The kernel is the part of the operating system that controls access to system resources and schedules running processes, and thus has total control of the computer. Most signature based schemes are not implemented in the kernel, as the scanning signature based schemes require to match signatures with the data on the computer would not be very efficient to implement in the kernel. A consequence of this is that signature based schemes are not in a good position to remove recalcitrant malware, again resulting in incomplete and unsatisfactory removal.

Other solutions to malware removal are based on the idea of "undo", whereby the actions of untrusted programs are recorded, and can be "undone" to restore the system to a clean state. Because it is difficult to know which programs to trust, "undo" systems tend to end up recording all the actions of the majority of the programs on the system, and thus require large amounts of storage. "Undo" schemes also fail to address the problem of identifying all portions of the malware.

SUMMARY

Embodiments of the invention address the problem of removing malicious code from infected computers.

DETAILED DESCRIPTION

Figure 1:
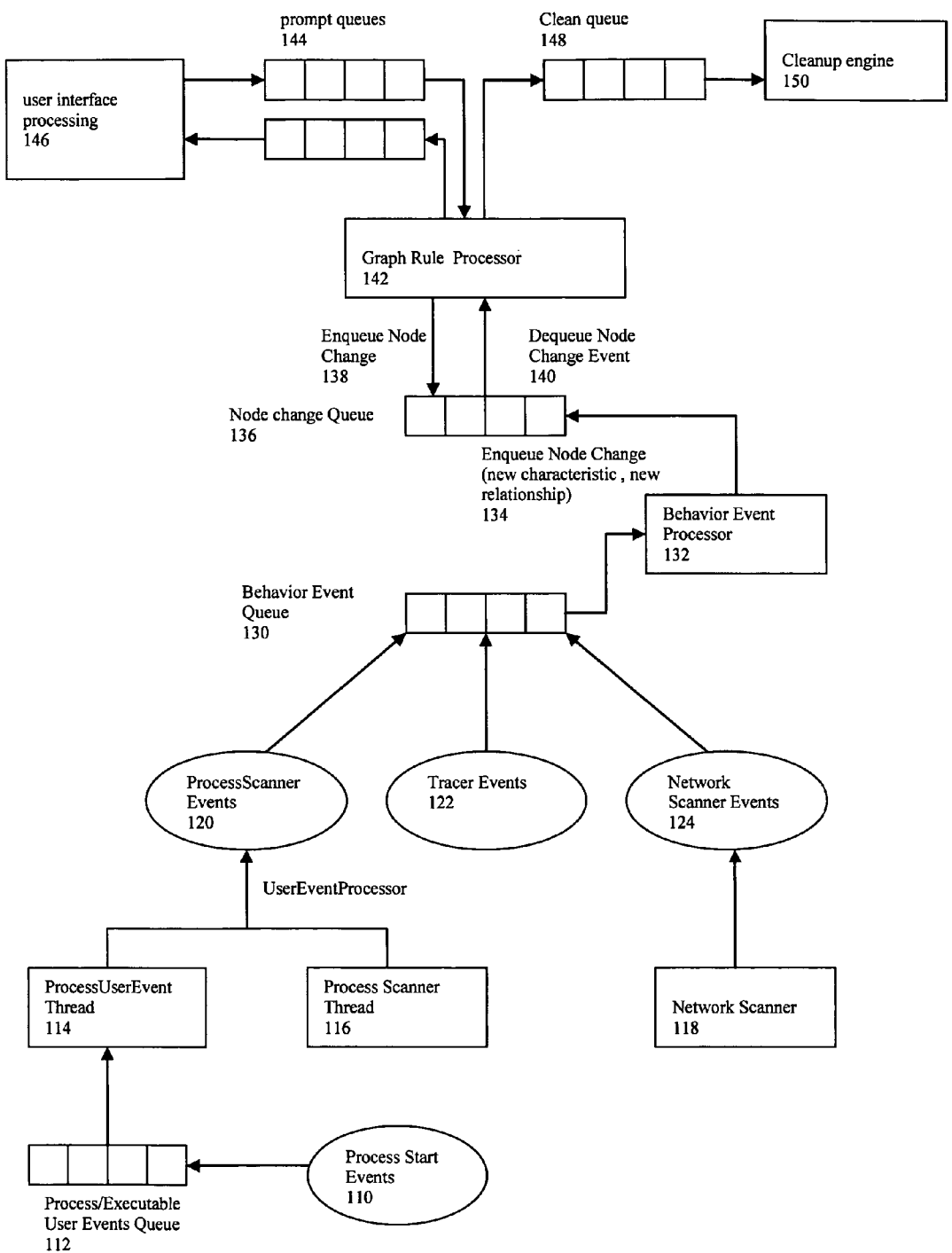
FIG. 1 shows an example of an architecture of a system that detects and removes malware from a computer.

Various embodiments couple a detection mechanism of malicious software with a graph structure, thereby improving on either mechanism used in isolation. The graph structure improves the accuracy of the detection mechanism. Malicious programs tend to consist of multiple pieces. Malware could have a dropper or installation program, a program with a payload, and perhaps extra modules. For example, programs that install a keyboard logger using the Windows Hook mechanism, a well known technique to gain access to keys typed on the keyboard to steal logins and passwords, have an extra dynamically linked library or dll file.

These multiple pieces differ in how malicious they appear, when considered independently. The installer probably behaves in roughly the same way as any legitimate installer, by copying files and setting up configuration data for the payload carrying part of malware. A detection mechanism attempting to detect all of these pieces independently would have to a very low threshold of sensitivity, which would likely result in many false positive mistakes, or detecting normal programs as malicious. Such errors are undesirable and lead to the removal of useful software and wasted time of the user. Ultimately, they may cause the user to stop using the malware detection/removal software.

However, by combining the detection method with a graph, the sensitivity can be set high. False positives are reduced, though perhaps only the payload part is detected. However, the graph structure percolates from the node representing the payload to all the other pieces of malware, therefore detecting associated pieces of the malware. The associated pieces are not malicious when considered independently, but are malicious when associated with software that is strongly malicious. Thus, the combination of detection with a graph improves detection without increasing the rate of false positives.

This combination is also effective at removing harmful software, even if the vendor of the security program has not released a security update specific to the harmful software after the initial installation. This combination is also effective at removing software, regardless of the absence of an uninstall script.

Additionally, the detection mechanism improves the accuracy of the removal process. If a process is determined to be malware, although that information is easily percolated around the graph, the difficulty rests in knowing where to stop the percolation. Without an accurate stopping condition, either not enough is removed, or too much is removed. However, an assessment of each node from the detection mechanism enables an intelligent stopping condition that takes into account the likelihood that each node is malicious. The result is accurate removal.

In addition, prior user approval of events does not prevent accurate detection of malware, and does not inoculate potential malware form being identified as malware. Thus, the technology is effective in both embodiments with and without user approval of events (whether or not caused by harmful software).

FIG. 1 shows an example of an architecture of a system that detects and removes malware from a computer.

Events are measured from the operating system kernel and using other sensors. These events are converted into a standard format, the "Behavioral Event". In the standard format, these events share the same data structure: a name, a source, and a target, where the source and target are the identifiers of the nodes affected by the event. Nodes are files and processes on the computer, as discussed below. Relationships correspond to the edges that connect the nodes of the graph. For the case where an event triggers a new relationship, e.g. a process installing an executable, the source contains the identifier of the process, and the target contains the identifier of the new executable. For the case where an event triggers the change in a characteristic, such as an event generated when a process does not have a visible window, the source is the identifier of the process that gets the characteristic, and the target is left empty. Other behaviors triggering the event can be specified.

The behavioral events are mapped into new relationships or characteristics using a behavior event processor. This takes as input a data structure that specifies the mapping between behavioral events and relationships/characteristics. The mapping is many to many, as for example many events could generate a registers relationship. Upon receiving a behavioral event, the behavior event processor determines what changes to make to which nodes, causing those those nodes to be altered. Nodes to be changed are placed in a node change queue for processing by a graph rule processor.

The following is a more specific description of this process.

ProcessScanner Events 120, Tracer Events 122, and Network Scanner Events 124 generate, or detect, events differently. Harmful software is observed generally based on runtime events, with some events based on polling, such as events generated by ProcessScannerEvents 120. The process scanner events are generated by periodically polling the list of running processes in the system and looking for certain characteristics. ProcessUserEvent Threads 114 and Process Scanner Threads 116 split the workload for event processing, depending on whether a process that is visible by the tracer from the kernel is also visible from user space, periodically scanning the processes. ProcessUserEvent Threads 114 receives events from the Process/Executable User Events Queue 112, which is filled by Process Start Events 100. Tracer Events 122 are received through hooking the kernel. Network Scanner Events 124 scans through active connections on a box from the Network Scanner 118. The network events can come out of the tracer as well.

The events generated by ProcessScanner Events 120, Tracer Events 122, and Network Scanner Events 124 are queued in the Behavior Event Queue 130. The queued events are analyzed by Behavior Event Processor 132. The Behavior Event Processor 132 forwards node changes such as new or removed characteristics, new nodes and relationships, and removed nodes and relationships to be queued at Node change Queue 136. These queued node changes are handled by Graph Rule Processor 142. The Graph Rule Processor 142 interacts with user interface processing 146 via prompt queues 144, and interacts with cleanup engine 150 via clean queue 148.

The Behavior Event Processor 132 has a malicious software detector that combines the behaviors exhibited by nodes to generate a score that is an indication of the maliciousness of each node. The Graph Rule Processor 142 is a tracking system that maintains a graph of how the various executables and processes on the system interact with one another, for example who installs whom, who spawns whom, who writes configuration data for whom etc. The Graph Rule Processor 142 also maintains for each node a list of the configuration data associated with the node, both the data the node has written, and the data that is associated with the node.

Figure 2:
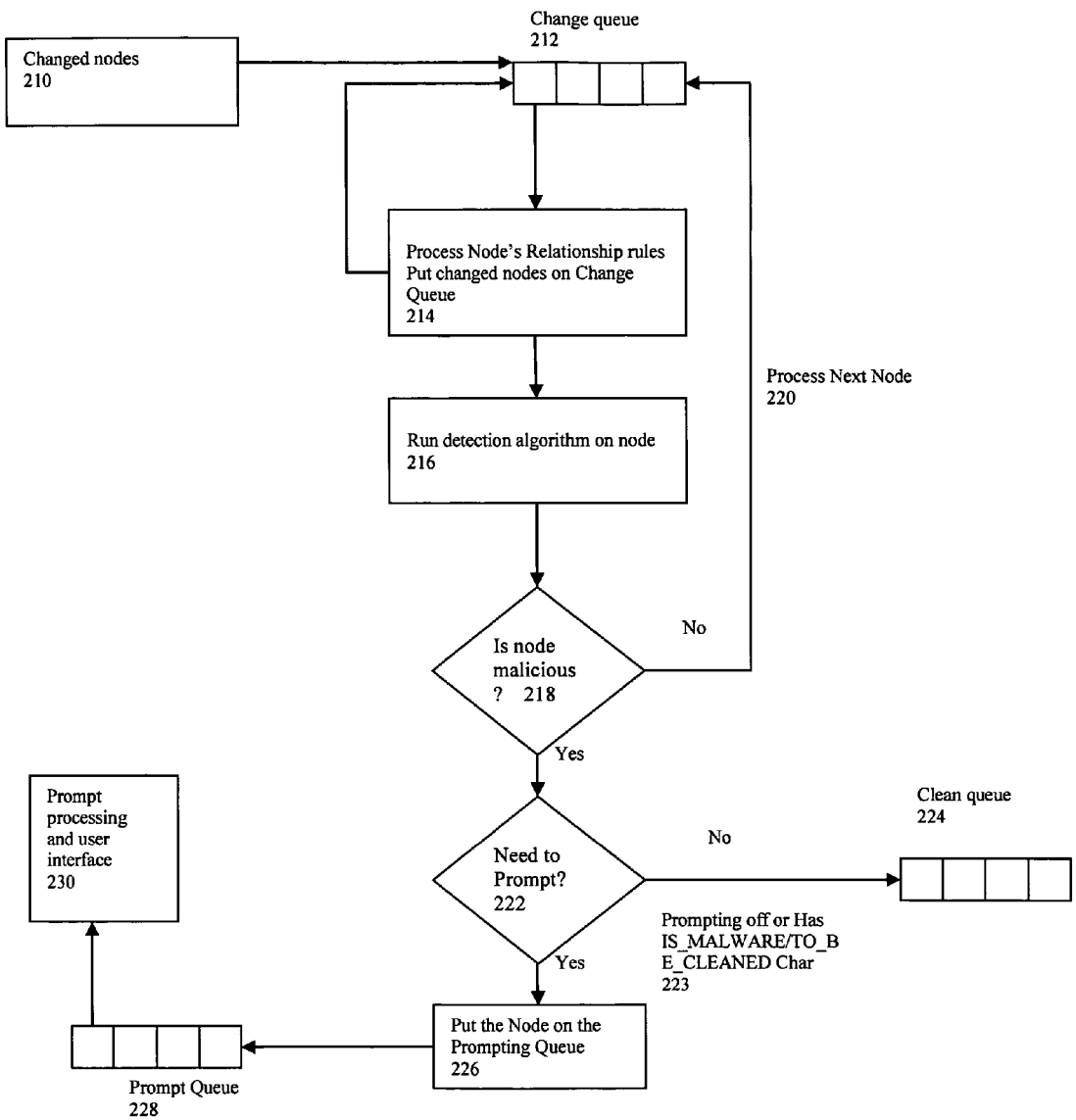
FIG. 2 shows an example of a process flow that updates nodes of the graph representing the processes and files of the computer.

FIG. 2 shows an example of a process flow that updates nodes of the graph representing the processes and files of the computer. In particular, FIG. 2 shows an example of Graph Rule Processor 142 of FIG. 1.

The graph rule processor applies the rules to the graph nodes. Given a change to a particular node, or a new link added to the graph, the graph processor evaluates the rules for the affected nodes, and applies the actions defined in the rules to the relevant nodes. If those nodes change as a result of the rules, then these changed nodes are also considered to see if these changed nodes trigger further changes. This process then continues recursively until all the queued changes have occurred. As processes run on the system, the actions of the processes are monitored and result in creation of the graph. For example, if process a.exe spawns b.exe, if the nodes do not exist already, the graph is amended to add nodes for the executables a.exe and b.exe, processes a.exe and b.exe, and a "spawn" link from the process node for a.exe to the process node of b.exe.

When a node is deemed to be malicious and marked for cleaning, the graph rule processor places that malicious node on the clean queue, to be handled by the removal engine. In addition, to enable interaction with the user of the computer, the node may also be placed on a queue to the user interface processing. The reply from the user is placed in a second queue, which is also serviced by the graph processor.

The following is a more specific description of this process.

Changed nodes 210 are received by a queue of changed nodes 210. The subsequent node to be processed is served by the processor, where the processing 214 checks each rule condition against the node. If a rule condition evaluates to true, the processor applies the action. If the action causes a change in any node's characteristics, then that changed node is added to the change queue 212 for processing. As part of the processing, the processor can calculate whether the node has a high enough score to trigger being classed as malicious, by running a detection algorithm 216. If the node is not malicious, the next node in the change queue 212 is processed. Otherwise, the node is marked to be removed, and placed on the clean queue 224 for removal by the cleaning engine. In 226, alternatively the node can be placed on a prompting queue 228 to interact with the user of the computer. The prompting refers to prompting the end user whether or not the end user wants to remove the node via a user interface 230. The second queue of user replies is not shown.

The detection algorithm 216 runs in the kernel of the operating system. The detection algorithm 216 detects a subset of the actions of all running processes, and also controls those running processes by being able to kill or suspend those running processes. Running from the kernel gives accurate information, as opposed to detection in user space, which can be tampered with by other user space processes, in particular the malware itself. Running from the kernel also provides sufficient controls to be able to kill and remove arbitrary programs.

An example detection mechanism is described in U.S. Patent Application No. 60/658,441 filed Mar. 4, 2005, titled "Method and Apparatus for Detecting Harmful Software" which is incorporated by reference. This example detection mechanism distinguishes between harmful software and safe software based on observing combinations of characteristics. In several approaches described herein, such characteristics are inherited between different nodes and passed among the nodes.

Rather than relying on an autonomous detection algorithm, the detection component in some embodiments is triggered by user selection.

When a particular process is found to be malicious, autonomously from the detector or from a program matching a signature, or manually from a user indicating that a particular process is malicious, then that information is percolated around the graph. This percolation ensures that not only a specific piece of software determined as malicious, but also the associated programs (such as the installer and child processes) as well as the associated configuration data, are all automatically removed. In this way, after a node is marked as malicious and thus to be removed, the malicious code is completely removed from the system.

The graph and detection component are continually evaluated and maintained throughout the normal running of the computer and during the removal process. As a result, the system remains up-to-date, because what will be removed is based on what has actually happened up to that time. Another result is that the system is customized to the particular machine. Any attempts by the malware to resist cleaning (e.g. by spawning other processes) are added to the graph as new nodes and removed as part of the cleaning process. The storage requirements are kept low by carefully choosing parts of the system to track and record.

The graph rule processor 242 passes information around the graph. The specification for how this information is passed around the graph is defined by a set of rules, corresponding to the edges connecting the nodes. The information passed around the graph is ultimately stored as a set of characteristics for each node, which also serves as a source of information to pass around the graph. The set characteristics defined by the metadata is extensible.

The rules pass round information on which executables, processes or configuration data needs to be removed. The rules also pass other information around. For example if an executable is marked as TRUSTED, that information is passed to associated processes linked to the executable via an "instance_of" relationship. The associated processes thereby inherit that characteristic value.

In general, a rule consists of a condition and an action, either of which could be on either end of the relationship. The condition takes a variety of forms, as follows:

A condition on a set of characteristics, for example a characteristic such as TO_BE_CLEANED is on, and another characteristic is off.

A condition on an attribute of the node (e.g. name=cmd.exe)

A condition triggered when the process associated with the node dies

A condition that is always true.

A condition on the command line arguments of a process node.

The action takes a variety of forms, as follows:

Set or remove a particular characteristic (or a set of characteristics)

Inherit the value of a characteristic from the other end of the relationship

Merge a set of characteristics with the other end, i.e. take a Boolean "or" of the values of each characteristic at either end of the relationship Set the values at the action end to the result Inherit the relationships associated with the node, i.e. to copy and add new relationships from the action node to nodes connected to other nodes.

These sets of conditions and actions provide a powerful language with which to specify how characteristics are passed around the graph by the Graph Rule Processor 242.

Examples of rules for various relationship types are as follows:

Spawn

If source:TO_BE_CLEANED, set target:TO_BE_CLEANED

If target:TO_BE_CLEANED, set source:MALWARE_ACTION

Processes spawned by a node to be cleaned are marked to be cleaned, and the parent of a process to be cleaned is marked as performing a malware action.

Spawn

If source Execname="cmd.exe" inherit target WINDOW_VISIBLE

If a process is running in a command line window and the window is visible then the process is visible.

Code Inject

If target:TO_BE_CLEANED, set source TO_BE_CLEANED

If a process has been code injected and is to be cleaned, then the process that injected it is also marked to be cleaned.

Instance_of

If source:TO_BE_CLEANED, set target:TO_BE_CLEANED

If target:(TO_BE_CLEANED AND NOT MEMORY_COMPROMISED), set source:TO_BE_CLEANED

If an executable is marked to be cleaned, then all children of the executable are marked to be cleaned. If a process is marked to be cleaned, the executable but not associated processes are marked to be cleaned, if there is no evidence that the memory of the process has been tampered with, e.g. by having foreign code injected into the process.

Figure 3:
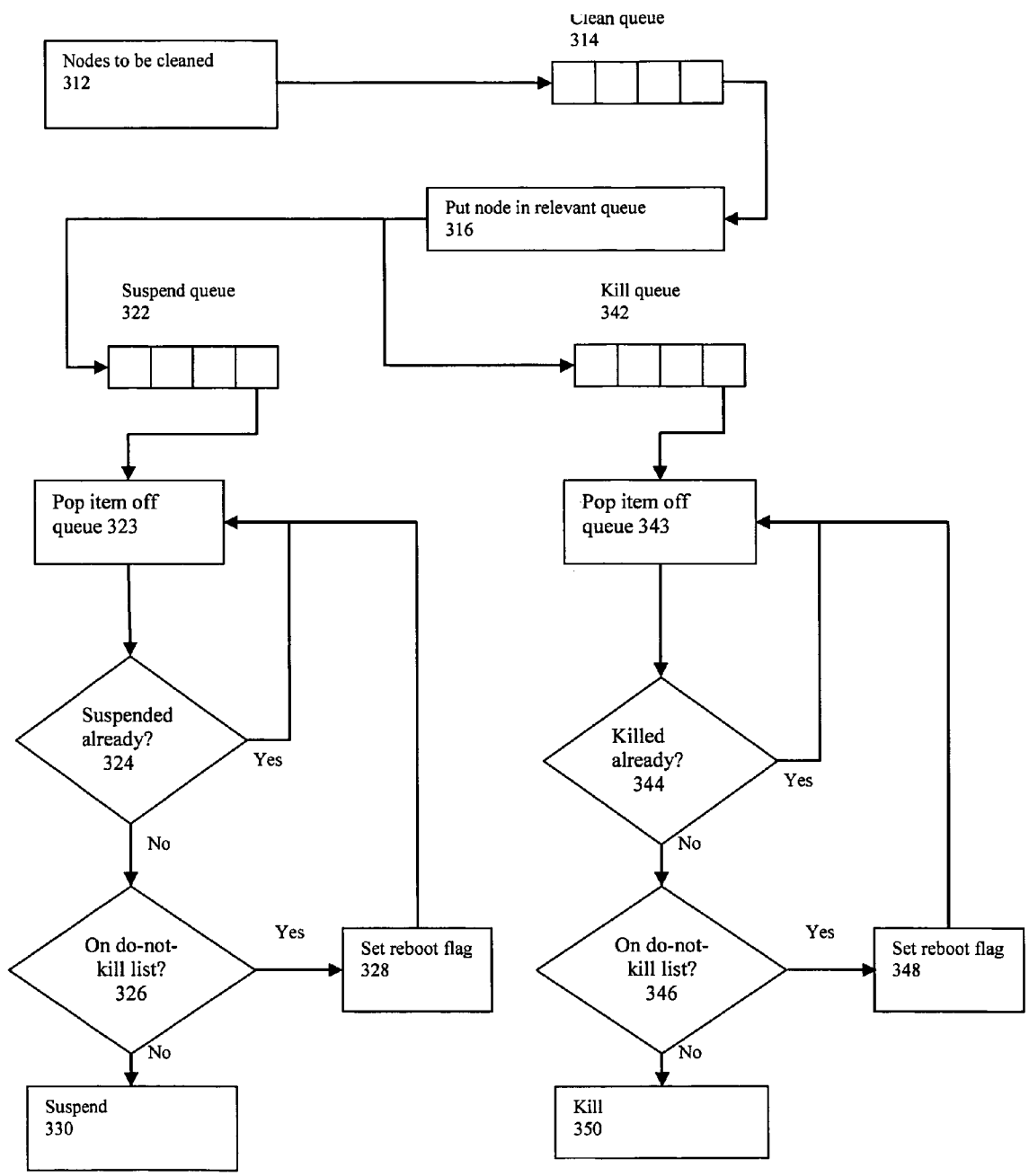
FIG. 3 shows an example of a process flow for removing processes of the computer.
Figure 4:
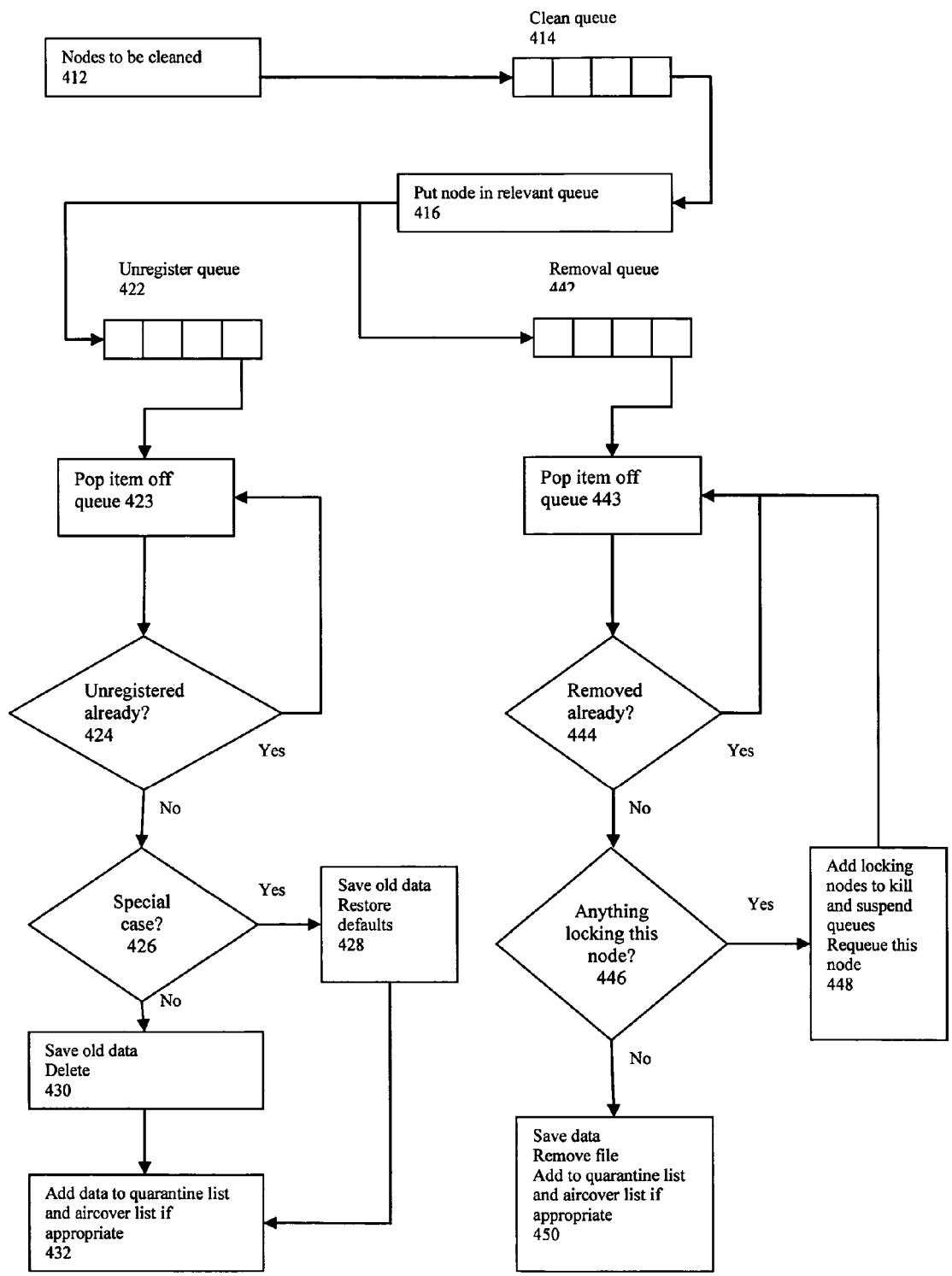
FIG. 4 shows an example of a process flow for removing files of the computer.

FIGS. 3 and 4 show examples of process flow for cleaning processes and files of the computer.

Process nodes are removed from the graph when processes die, but only when the process has no living children (in a "spawn" relationship). As part of the node metadata, a reference count of children is maintained, such as an integer which is incremented when a child process is spawned, and decremented when a child process dies. The node can be removed when the process has died and its reference count is zero.

Executable nodes are removed when the executable nodes have no living children (in an "instance of" relationship), and the executable image on disk no longer exists. As part of the node metadata, a reference count of children is maintained, such as an integer which is incremented when a child process is instantiated, and decremented when a child process dies. The executable image no longer exists, for example when the executable has been removed. This can be checked at regular intervals or at shutdown or restart.

In the Windows operating system, some programs run as "services". These are executables that are managed by the operating system, using the Service Control Manager. This program can start, stop and configure the other service programs. While this mechanism is usually used for system services e.g. remote procedure call, printing etc., it is also used for programs such as web servers and databases. Service programs are handled by the same queuing mechanisms, with the difference that calls to the Service Control Manager are made to suspend, stop and remove the service.

For the particular case of passing information around for removal, principles that are followed in generating the rules for cleaning the graph.

Anything done by a malicious node is automatically malicious. So TO_BE_CLEANED or equivalent characteristics are passed down through relationships "downstream" i.e. where the malicious node is the source of the relationship.

Any node that is directly upstream of the malicious node (e.g. the process that spawned it, or the process that installed it), is treated as suspicious. This is accomplished by modifying the detection algorithm. In the detection algorithm, a node is found to be malware if the node has a large enough score and the node has taken an action associated with malicious code (e.g. using the network, installing a keylogger etc.). Suspicious nodes are processes that have taken a malicious action. Being associated with malware is a sufficient condition for a process to be determined as malware. Suspicious nodes can have extra characteristics added that increase the score of the node. Suspicious nodes with a large enough score also are determined at the computer to be malware.

The cleaning algorithm takes nodes off the clean queue and then uses a set of internal queues to complete the cleaning. The processing in these queues takes care of suspending processes, killing processes, removing configuration data, and removing executables from the file system. The processing is designed to operate so that each queue and the processing of the queue operate asynchronously. The processing operates in strict priority order, suspending before killing before unregistering before removal.

When a node is removed from the clean queue, the type of the removed node is checked. If the removed node is a process node, then the removed node is added to the suspend and kill queues. If the removed node is an executable node, then the configuration data is added to the unregister queue, and the executable itself is added to the removal queue. The processing involved with servicing those queues is detailed in the following figures and text.

FIG. 3 shows an example of a process flow for cleaning processes of the computer.

Nodes to be cleaned 312 are sent to a clean queue 314. Nodes removed from the clean queue 314 are placed in a relevant queue 316, the suspend queue 322 or the kill queue 342.

The role of the suspend queue 322 is to suspend processes so that the processes cannot take any actions while being queued to be killed. Suspending processes helps with handling the delays that might be involved with killing multiple processes. Processes added to the suspend queue 322 are first checked to see if they are not already suspended 324. If yes, then processing terminates for that node. Next, the process is compared against a "do-not-kill" list of system processes that cannot be killed or suspended without affecting system stability 326. If the process is on this list, a flag is set that the system needs to be rebooted 328 and processing terminates. If the process is free to be suspended, the process is suspended 330.

The kill queue 342 is responsible for killing the processes, freeing up their resources and allowing them to be removed. On the Windows operating system it is not possible to modify the executable on disk if that executable is loaded into memory. Processing for the kill queue 342 is similar to processing for the suspend queue 322. Processes added to the kill queue 342 are first checked to see if they are not already killed 344. If yes, then processing terminates for that node. Next, the process is compared against a "do-not-kill" list of system processes that cannot be killed or suspended without affecting system stability 346. If the process is on this list, a flag is set that the system needs to be rebooted 348 and processing terminates. If the process is free to be killed, the process is killed 350.

FIG. 4 shows an example of a process flow for cleaning files of the computer.

The general approach taken in the removal algorithm is to remove the configuration data from the registry (so that the executable/module will not be loaded post reboot), reboot, and then delete the executable/module. However, there is also a facility whereby programs can be alerted when registry keys change, and rewrite keys that were removed. If the executable that is doing the rewriting can be killed, this is not a problem, and the removal algorithm can be sure that the state has been removed from the registry and that the module will not be loaded and locked from removal post reboot.

Nodes to be cleaned 412 are sent to a clean queue 414. Nodes removed from the clean queue 414 are placed in a relevant queue 416, the unregister queue 422 or the removal queue 442.

The unregister queue 422 is responsible for removing the configuration data associated with the node. The configuration data is a set of registry keys that either were written by the process, or point to the node. The processing involves saving the copy of the registry keys for subsequent restoration, deleting the data and then terminating. Processes added to the unregister queue 422 are first checked to see if they are not already unregistered 424. If yes, then processing terminates for that node. Some registry keys need to be returned to their default values rather than being removed 428. Returning registry keys to default values is accomplished with a list of special cases 426. In order to catch processes that attempt to reinstall themselves, the removed keys are written to a "quarantine" list 432, that can be consulted as part of the event analysis. In addition, some configuration settings need to be protected to disallow further writes to these configuration settings. This is accomplished by adding the keys to an "aircover" list 432. If the node is not a special case, prior to deletion, the old data is saved 430, and the quarantine list or aircover list is updated as appropriate. In another embodiment, a list of executables is maintained, which should not be written into the registry.

The removal queue 442 is responsible for removing executables and other files from the file system. Processes added to the removal queue 442 are first checked to see if they are not already removed 444. If yes, then processing terminates for that node. Because some files cannot be removed when loaded by a process, the processing checks to see if the file can be removed 446, and if the file cannot be removed, the processes that are locking the file are placed on the suspend and kill queues 448. The file is then added to a compressed archive and then deleted from the file system. The file subsequently can be restored from the archive should a mistake have been made. The files removed are recorded on the "quarantine list" in order to detect reinstalls or quarantine list 450.

Aircover operates as follows. In the Windows operating system, most system configuration occurs in the Registry. On reboot, the operating system queries the registry to determine which programs to load. When a program is running, or a module is loaded, it is impossible to delete the executable from the file system, as the file on disk is locked. If the process rewriting the configuration data is one that cannot be killed, for example a system process with a rogue code module loaded into the system process, then there is a problem. The removal algorithm cannot be sure that the state has been removed, and cannot kill the process that is rewriting the state.

The solution to this is to prevent processes from rewriting keys to sensitive parts of the registry, so ensuring that post reboot, the module will not be loaded and can be removed. This is accomplished by maintaining an aircover list of registry keys where writes are denied. The aircover list can also include files that should not be allowed to be created. The list does not need to be persisted post reboot.

The following discussion provides more details about graphs.

The nodes on the relationship graph are the processes and executables on the system. The node for the executable corresponds to the executable file on disk. The node is identified by the file path, and optionally a checksum (hash) of all or part of the file. The process node is identified by the process id of the process assigned by the operating system. The process node is also optionally identified by the creation time of the process, because in some operating systems, such as Windows, the process ids are reused once a process has died. Thus, adding the creation time guarantees a unique identifier. Nodes labeled "system" are pseudo processes for the operating system kernel, used for accounting purposes.

In normal cases, the process of an executable runs the code in the executable and thus behaves in a way constrained by that code. The executable and process nodes are separated, even when the process is an instantiation of the executable, because foreign code can be injected into running processes. That process then runs code not associated with the executable, causing the process to behave differently.

Some processes on the Windows operating system act as "hosts" for scripts, executable files, and other types of files. For example, the rundll32.exe process allows a dll, a type of executable file that normally cannot be run as a process directly, to run as a process. Another example is a .bat file, which is a script file that is normally run by a cmd.exe process. These are handled as a set of special cases, making the executable node on the graph correspond to the script, and the process node correspond to the host process.

The relationships and characteristics are defined through metadata and can be added with out modifying the code.

The edges of the relationship graph indicate the relationships between the nodes. These links are normally directed, with a clear definition of source and target, but do not have to be so. Example relationship types are process-file relationships that exclude instance-of relationships, instance-of type process-file relationships, process-process relationships, and file-file relationships. The relationships include, but are not limited to:

Installs. A process wrote a file to disk, such as an executable or a script file. This is a link between a process node and an executable node.

Spawns. A process spawned (started) another process, with the original process being the parent of the new child process. This is a link between two process nodes.

Registers. A process wrote some configuration data associated with a particular executable, for example a process writing a key in the registry that causes another executable to survive a reboot. This is a link from the writer of the data, to the newly registered executable.

Code Inject. A process wrote into the memory of another process, so causing the second process to run foreign code. This is a link from one process node to another.

Instance_of. A link from an executable to the running instances (processes) of that executable, for example from the node for notepad.exe to the notepad.exe processes running in the system.

Kills. A link from one process to another saying that the source has attempted to kill (or shutdown) the other process.

Same Hash. An example of an undirected link, put between two executable nodes sharing the same hash, i.e. they are copies of one another.

Characteristics are tracked for each node of the graph. The graph passes information about the characteristics around the graph, depending on the rules. The characteristics include, but are not limited to:

IMAGE_CHANGED. The executable file was updated. This implies that the executable has been modified on disk since monitoring this executable. This could be because the executable has been updated as part of a normal software update process, or in the worst case that the executable has been modified by a malicious program to run malicious code (for example, a file infecting virus).

SURVIVE_REBOOT. The executable is configured to automatically restart. On each reboot, Windows will automatically run the executable. Malicious programs generally need to survive reboot in order to be effective at stealing information from the user. However, many legitimate programs also survive reboot.

GUESS_SURVIVED_REBOOT. The executable appears to survive reboot as it runs immediately after the start of the Service Control Manager. While the executable was not explicitly registered to survive reboot, it did start immediately after the system was started, and thus appeared to survive reboot. Malicious programs generally need to survive reboot in order to be effective at stealing information from the user. However, many legitimate programs also survive reboot.

PARENT_SURVIVED_REBOOT The executable is spawned by a process that survives reboot. The executable is the child process of a process that survived reboot, so that it itself probably survived reboot. For example, if program TROJANSTARTER.EXE is set to survive reboot, and when it runs it spawns THETROJAN.EXE, then THETROJAN.EXE will actually survive the reboot, even though it was not explicitly registered to do so. This characteristic captures this behavior. This can be indicative of trojan behavior, as they sometimes use this level of indirection to avoid detection. It is relatively rare for normal programs to have this characteristic.

HAS_BEEN_ORPHAN The executable is an orphan process. The process is an orphan: its parent process has died. This is relatively rare for normal programs, but common in malicious programs.

IS_SPAWNER. The executable spawns other processes. The executable has spawned child processes.

ACTION_USED_NETWORK. The executable accessed the network. The executable used the network, either as a client accessing services on other machines, or listening on a certain network port. Malicious programs need to use the network to communicate with their controllers, send out information, receive software updates etc. However, many legitimate programs also use the network.

ACTION_UNUSUAL_NETWORK. The executable has unusual network activity. Programs that have this characteristic are already protected through application protection (either there is a profile for the application, or it is one protected after being discovered with application discovery). In this case, a profile will have been learned of how this executable uses the network. This characteristic means that the executable has used the network in a way that is anomalous (different from the previously learned behavior). This could mean that the application has been compromised. Possibly "The executable file was updated or it has had rogue code injected into its memory" (see "The process has had possibly malicious code injected into it by another process").

WINDOW_NOT_VISIBLE. The executable does not display a window on the screen. The executable does not have a window that is visible on the desktop. This implies that the program is trying to be stealthy, and invisible to the user. The majority of malicious programs will have this characteristic, however many system processes do not have visible windows.

PROCESS_IS_HIDDEN. The process is hidden from Windows Task Manager. In Windows, it is possible for programs to interfere with other processes by injecting code into their memory space. This is also known as "dll injection" as the code injected is usually contained a dll file. One common use for this code is to hide information from those programs. For example, it is possible to hide a running process from the Windows Task Manager (which normally lists all running processes), by injecting code into the Task Manager's memory space to modify how it displays processes to the user. A malicious program can use this technique to remain hidden from the user.

SMALL_IMAGE_SIZE. The size of the executable file image is very small. Malicious programs try to be stealthy, and one way to be stealthy is to minimize the impact on the underlying system. They are thus often small, lightweight programs. This characteristic means that the executables size is small. However, many normal executables are also small (such as some system processes, utilities).

WRITES_TO_WINDIR. The executable attempted to write to the Windows directory. The executable created other executable files in the Windows directory. Often, malicious programs install themselves in the Windows directory, as that directory contains many executables, and it is easy to remain unnoticed there. This is an indication of malicious behavior. However, some legitimate installation programs also copy executables to this directory.

WRITES_TO_PGM_FILES. The executable attempted to write to the Program Files directory. The executable created another executable file in the Program Files directory. This is the directory that most normal programs are installed by default, and would indicate that this program is likely to be a normal installation program. However, some malicious programs (particularly adware) install themselves in this directory.

EXEC_FROM_CACHE. The executable is executed from a cached area.

EXEC_FROM_WINDIR. The executable is executed from the Windows directory.

EXEC_FROM_PGM_FILES. The executable is executed from the Program Files directory.

OTHER_PATH. The executable did not execute from the Program Files directory, Windows directory or a cached area.

The above four characteristics are a report of where in the file system the executable resides. While this is not a strong indicator of malicious intent, it provide some hints about the type of executable that is running. Executables that run from the Program Files directory are likely to be legitimate, because that is the default directory where third-party software is installed. Some adware programs also run from this directory. Executables that run from the cache are more suspicious. Either they have been downloaded and run directly from a browser or email client, or they are programs running from the cache to hide themselves. Executables that run from the Windows directory can be suspicious. Often, malicious programs run from the Windows directory because there are many executables in that directory and it is easy to remain undetected there. However, most of the core windows executables and utilities run from this directory.

IS_SHADOW The executable has the same name as a legitimate executable. This is evidence of a common mechanism that trojans and other malicious code use to hide themselves on a computer. They run with the same name as a legitimate executable, but are placed in a different part of the file system. For example, the real SERVICES.EXE (the legitimate Windows Service Control Manager) runs from C:\WINDOWS\SYSTEM32\SERVICES.EXE. A trojan many call itself SERVICES.EXE but be installed as C:\WINDOWS\SERVICES.EXE. If viewed in the Task Manager (which does not show the full path to the executable), both will look like legitimate SERVICES.EXE processes. An executable with this characteristic is suspicious. A known legitimate executable that occasionally has this characteristic is the Java SDK and JRE. Java is often installed in many different locations on a computer, and there are also commonly more than one installed version. This can result in some Java processes having this characteristic.

P2P_CODE_INJECTION. The executable attempted to inject code into the address space of another process. The executable forcibly attempted to inject code into other running processes, forcing them to run foreign code. This is also known as dll injection. This is generally evidence of malicious activity. The injected code could be the malicious payload, so a compromised Notepad process, for example, could be logging keys and reporting stolen logins/passwords to an attacker. Alternatively, the injected code could be a rootkit trying to hide the real malicious process from detection.

HAS_DOUBLE_EXTENSION. The file name of the executable has a double extension. The executable is in the form MALWARE.JPG.EXE, so it has two or more three-letter extensions. Windows is configured by default to hide known file extensions, so in this example the file would be shown on the screen as MALWARE.JPG. This might fool an unsuspecting user that they were opening a JPG or image file, when in fact they were opening an executable. This is highly suspicious.

WRITES_TO_REGISTRY_STARTUP. The executable attempted to write to the startup area of the Registry.

WRITES_TO_FS_OF_STARTUP_AREA. The executable attempted to write to the startup area of the file system.

The previous two characteristics indicate that the executable modified either portions of the registry or file system where executables are marked to be automatically restarted by Windows. This is suspicious because malicious programs must survive reboot to be effective on a user's machine, and they modify these areas to do so. Often they continually modify these areas to ensure that they continue to remain on the system. The normal programs that modify these places are installation programs, and some security programs (such as anti-virus, anti-spyware).

TERMINATE_PROCESS. The executable terminates another running process. Some malicious programs attempt to terminate security programs (such as anti-virus, anti-spyware) running on the machine in order to avoid detection. This characteristic is flagged if a program is detected attempting to kill others. It is rare for normal programs to forcibly kill others, apart from security programs (anti-virus, anti-spyware), and utilities such as Task Manager.

LOAD_KERNEL_MODULE. The executable attempted to load a kernel module. The executable attempted to alter the functioning of the operating system kernel by forcing it to load a kernel module. Kernel-level rootkits, which are powerful pieces of malicious software are kernel modules, and have to be loaded in order to run correctly. This characteristic thus could indicate the installer of a rootkit. There are number of normal programs that install kernel modules, notably anti-virus software, firewalls, and tools like Process Explorer, Regmon and Filemon from http://www.sysinternals.com.

PROCESS_MEMORY_COMPROMISED. The executable is a process code injection victim. This indicates that the process has had its memory compromised; another process has injected code into it. Code injection of this style is also known as dll injection. This means that the actions of the process may not be what they were originally programmed to be, as the process will be running the injected code. For example, a Notepad process could be running code to cause it to listen on a certain network port and allow remote access to the computer, which is not within the normal actions of a simple text editor. Generally a process with this characteristic is suspicious—it has been changed to run some other code.

PARENT_IS_VISIBLE_CMD_SHELL. The executable is spawned by a visible cmd window shell. Visibility is a strong indicator that a program is not malicious: most malicious software tries to be stealthy and hide from the user. This characteristic shows that the process is likely to be visible as it was spawned by a visible command shell window.

KEYLOGGER_WINDOWS_HOOK. The executable attempted to install a keylogger by a legitimate mechanism. Malicious programs install keyloggers to capture keystrokes and steal logins, passwords, and credit card numbers. Some legitimate programs install keyloggers to monitor whether the user is using the computer or not (for example, instant messaging programs that maintain a status). These legitimate programs often use a style of keylogger called a Windows Hook. This is a well-documented and accepted method for logging keys. This characteristic means that the program is logging keys using a legitimate mechanism. Any keylogging is suspicious, but this is a less suspicious way of doing it, at least compared to the following characteristic.

KEYLOGGER_GETKEYBOARDSTATE. The executable attempted to log keys; likely Spyware. The program attempted to log keys using a non-standard method, and is likely to be malicious. See "The executable attempted to install a keylogger by a legitimate mechanism." Programs that log keys can steal information such as logins, passwords and credit card numbers.

MODIFIES_HOSTS_FILE. The executable attempted to modify the hosts file.

MODIFIES_AUTOEXEC_BAT. The executable attempted to modify the autoexec.bat file.

MODIFIES_CONFIG_SYS. The executable attempted to modify the default set of drivers loaded at startup time.

The previous three characteristics are given when the executable attempts to modify configuration files associated with networking (hosts file), Windows startup (autoexec.bat file), or the default set of drivers loaded (config.sys file). While occasionally these files might be altered by an administrator, a program modifying these files is suspicious. The hosts file is an important file for configuring networking on the computer. By writing entries in the file, programs can redirect certain web sites to other places, without the user's knowledge. For example, all queries to www.google.com could be redirected to www.malicious-site.com. Autoexec-.bat is a file that determines how Windows starts up. Malicious programs can modify the file to force Windows to start malicious programs at startup. The default drivers file (config.sys) can be modified so that a rogue kernel module is loaded, which could enable rootkit functionality.

TURNS_OFF_WINDOWS_FIREWALL. The executable attempted to turn off the Windows firewall. The program attempted to turn of the Windows firewall installed by default in Windows XP SP2. Turning off the firewall would allow a malicious program to use the network without alerting the user. This action is suspicious.

HAS_SHORTCUT_IN_START_MENU. The executable has a shortcut in the start menu. The executable appears to have been installed correctly, and is thus likely to be legitimate. Some adware programs are installed correctly, but for the most part this is an indicator of a normal program.

SUFFICIENT. This characteristic implies that a process is suspicious, in particular that it has some how been involved in spawning, registering or installing a node that has been subsequently found to be malicious. This is passed by the relationship rules, and allows the involvement of the node with the malicious nodes to be included when calculating whether the node is malicious.

TO_BE_CLEANED. This characteristic means that the process or executable referred to by the node is marked to be removed.

IS_MALWARE. Same as TO_BE_CLEANED.

MALWARE_ACTION. This characteristic means that the node has taken an action that is associated with malware. For example, this characteristic is set when any of the following characteristics are set: ACTION_USED_NETWORK, KEYLOGGER_WINDOWSHOOK, KEYLOGGER_KEYBOARDSTATE, P2P_CODE_INJECTION, LOAD_KERNEL_MODULE. The exact set of actions that contribute to this characteristic is extensible.

IS_TERMINATED. This is set on a process node when the process dies. This is used as a marker to allow rules to be fired when processes die.

ALERTED_MALWARE. This is set on a node when it is found via the detection system to be malicious. It is a marker that an alert has been generated for that node. The alert is generally sent to the user for confirmation.

CONFIRMED_MALWARE. This is set on a node when a user has confirmed that he or she wants to remove a particular piece of malware. i.e. one with ALERTED_MALWARE set. It can also be set without a user if the system is in automatic removal mode.

INSTALLS_TOOLBAR. This is set when a process writes configuration data to cause the browser or the operating system to load a "toolbar", which is a piece of user interface functionality. For example a toolbar on Internet Explorer might allow the user to access a particular search engine directly from the window, without having to visit the search engine web page directly.

INSTALLS_COM_OBJECT. This is set when a process registers a particular executable as a COM object. COM is a Microsoft standard which allows programs to interact with one another using standard interfaces.

TAINTED_MALWARE. This characteristic implies that a process has had its process memory compromised, (similar to PROCESS_MEMORY_COMPROMISED), and that the action of the compromise caused the process to be detected to be malware. This characteristic is used to ensure that only the process that was the original cause of the compromise will generate an alert. It thus helps cut down on interaction with the user.

INSTALLS_BHO. The executable installed a Browser Helper Object.

Example graphs are provided in the following tables. These graphs demonstrate the successful identification of various components associated with the effects of malware infection, which are then removed. Tables A and B are a graph of nodes and edges representing files and processes from a computer infected with the malware "Buttman", a backdoor type program. Tables C and D are a subgraph of Tables A and B, with the nodes determined to represent files and processes of the malware "Buttman" and other related nodes. Tables E and F are a graph of nodes representing files and processes from a computer infected with the malware "Lyricsdomain", occurring when the computer visit the spyware filled site lyricsdomain.com. Tables G and H are a subgraph of Tables E and F, with the nodes determined to represent files and processes of the malware "Lyricsdomain" and other related nodes. Tables I and J are a graph of nodes representing files and processes from a computer infected with the malware "Nuclearrat", here are tables for nuclear rat, a rat (remote access trojan) that injects code into internet explorer. Tables K and L are a subgraph of Tables H and I, with the nodes determined to represent files and processes of the malware "Nuclearrat" and other related nodes. Tables K and L illustrate that the malware process is identified, but the uninfected executable is not removed. The number in parentheses after the file name is the pid. When the pid is 0, the node is executable.

TABLE A (graph nodes of computer infected with the malware "Buttman").

| | | |
|---|---|---|
| node1 | C:/DOCUMENTS AND SETTINGS/ADMINISTRATOR/DESKTOP/TROJANEXECUTABLES/BACKDOOR.BUTTMAN.EXE (0) | SUFFICIENT<br>SURVIVE_REBOOT<br>TO_BE_CLEANED |
| node2 | C:/PROGRAM FILES/VMWARE/VMWARETOOLS/VMWARETRAY.EXE (0) | IMAGE_CHANGED<br>SMALL_IMAGE_SIZE<br>SURVIVE_REBOOT |
| node3 | E:/CLEANUP/GUI/ALERTMFC.EXE (0) | |
| node4 | C:/PROGRAM FILES/VMWARE/VMWARETOOLS/VMWARESERVICE.EXE (0) | IMAGE_CHANGED<br>SURVIVE_REBOOT |
| node5 | C:/WINNT/SYSTEM32/CSRSS.EXE (0) | SMALL_IMAGE_SIZE |
| node6 | C:/PROGRAM FILES/VMWARE/VMWARETOOLS/VMWAREUSER.EXE (0) | IMAGE_CHANGED<br>SURVIVE_REBOOT |
| node7 | C:/PERL/BIN/PERL.EXE (0) | SMALL_IMAGE_SIZE |
| node8 | C:/WINNT/SYSTEM32/SPOOLSV.EXE (428) | SMALL_IMAGE_SIZE<br>WINDOW_NOT_VISIBLE<br>SURVIVE_REBOOT |
| node9 | C:/WINNT/SYSTEM32/CSRSS.EXE (164) | SMALL_IMAGE_SIZE<br>WINDOW_NOT_VISIBLE |
| node10 | C:/WINNT/SYSTEM32/CMD.EXE (840) | HAS_SHORTCUT_IN_START_MENU<br>IS_SPAWNER |
| node11 | C:/WINNT//SYSTEM32/BROWSEUI.DLL (0) | |
| node12 | C:/WINNT/SYSTEM32/SERVICES.EXE (0) | SURVIVE_REBOOT |
| node13 | C:/WINNT/SYSTEM32/REGSVC.EXE (0) | SURVIVE_REBOOT |
| node14 | C:/WINNT/SYSTEM32/MSTASK.EXE (528) | MALWARE_ACTION<br>WINDOW_NOT_VISIBLE<br>SURVIVE_REBOOT<br>ACTION_USED_NETWORK |
| node15 | C:/WINNT/SYSTEM32/CMD.EXE (1004) | IS_SPAWNER<br>IS_TERMINATED<br>HAS_SHORTCUT_IN_START_MENU |
| node16 | C:/WINNT/SYSTEM32/PSSUSPEND.EXE (0) | |
| node17 | C:/WINNT/ICQMAPI.DLL (0) | TO_BE_CLEANED |
| node18 | C:/PROGRAM FILES/VMWARE/VMWARETOOLS/VMWARESERVICE.EXE (668) | IMAGE_CHANGED<br>WINDOW_NOT_VISIBLE<br>SURVIVE_REBOOT |
| node19 | C:/WINNT/SYSTEM32/WBEM/WINMGMT.EXE (0) | SURVIVE_REBOOT |
| node20 | C:/WINNT/SYSTEM32/PSKILL.EXE (0) | |
| node21 | C:/WINNT/SYSTEM32/SMSS.EXE (0) | SMALL_IMAGE_SIZE |
| node24 | C:/DOCUMENTS AND SETTINGS/ADMINISTRATOR/DESKTOP/TROJANEXECUTABLES/BACKDOOR.BUTTMAN.EXE:620 (620) | KEYLOGGER_WINDOWS_HOOK<br>SUFFICIENT<br>WRITES_TO_REGISTRY_STARTUP<br>SURVIVE_REBOOT<br>TO_BE_CLEANED<br>IS_TERMINATED<br>MALWARE_ACTION<br>CONFIRMED_MALWARE |

TABLE A-continued (graph nodes of computer infected with the malware "Buttman").

| | | |
|---|---|---|
| | | WRITES_TO_WINDIR |
| | | WINDOW_NOT_VISIBLE |
| | | ALERTED_MALWARE |
| node23 | C:/WINNT/SYSTEM32/WUAUCLT.EXE (844) | WINDOW_NOT_VISIBLE |
| node24 | C:/WINNT/SYSTEM32/WUAUCLT.EXE (0) | |
| node25 | C:/WINNT/SYSTEM32/CMD.EXE (1176) | HAS_SHORTCUT_IN_START_MENU IS_SPAWNER |
| node26 | C:/WINNT/SYSTEM32/LSASS.EXE (224) | MALWARE_ACTION SMALL_IMAGE_SIZE WINDOW_NOT_VISIBLE SURVIVE_REBOOT ACTION_USED_NETWORK |
| node27 | StaANAAGENT.EXE (1052) | |
| node28 | SYSTEM (0) | |
| node29 | C:/PERL/BIN/PERL.EXE (644) | SMALL_IMAGE_SIZE WRITES_TO_WINDIR WRITES_TO_REGISTRY_STARTUP IS_SPAWNER |
| node30 | C:/WINNT/FNGKHLIB.DLL (0) | TO_BE_CLEANED |
| node31 | C:/WINNT/SYSTEM32/CMD.EXE (0) | |
| node32 | C:/WINNT/SYSTEM32/SVCHOST.EXE (400) | MALWARE_ACTION SMALL_IMAGE_SIZE WINDOW_NOT_VISIBLE SURVIVE_REBOOT ACTION_USED_NETWORK IS_SPAWNER |
| node33 | C:/WINNT/SYSTEM32/CMD.EXE (1132) | IS_SPAWNER IS_TERMINATED MALWARE_ACTION TERMINATE_PROCESS HAS_SHORTCUT_IN_START_MENU |
| node34 | SANAAGENT.EXE (0) | |
| node35 | C:/PROGRAM FILES/SANASECURITY/PRIMARY RESPONSE/AGENT/BIN/SANAUI.EXE (0) | SURVIVE_REBOOT |
| node36 | C:/WINNT/SYSTEM32/SMSS.EXE (140) | SMALL_IMAGE_SIZE WINDOW_NOT_VISIBLE IS_SPAWNER |
| node37 | C:/WINNT/SYSTEM32/WBEM/WINMGMT.EXE (692) | WINDOW_NOT_VISIBLE SURVIVE_REBOOT IS_SPAWNER |
| node38 | C:/WINNT/SYSTEM32/SERVICES.EXE (212) | TERMINATE_PROCESS MALWARE_ACTION WINDOW_NOT_VISIBLE SURVIVE_REBOOT ACTION_USED_NETWORK IS_SPAWNER |
| node39 | C:/WINNT/SYSTEM32/PSSUSPEND.EXE (724) | IS_TERMINATED WINDOW_NOT_VISIBLE |
| node40 | C:/WINNT/SYSTEM32/WINLOGON.EXE (0) | |
| node41 | C:/PROGRAM FILES/VMWARE/VMWARETOOLS/VMWARETRAY.EXE (1016) | SMALL_IMAGE_SIZE IMAGE_CHANGED WINDOW_NOT_VISIBLE SURVIVE_REBOOT |
| node42 | C:/PROGRAM FILES/SANASECURITY/PRIMARY RESPONSE/ AGENT/BIN/SANASCANNER.EXE (0) | SMALL_IMAGE_SIZE |
| node43 | C:/WINNT/EXPLORER.EXE (896) | SUFFICIENT WRITES_TO_REGISTRY_STARTUP IS_SPAWNER INSTALLS_TOOLBAR |
| node44 | C:/WINNT/SYSTEM32/PSKILL.EXE (876) | IS_TERMINATED MALWARE_ACTION TERMINATE_PROCESS WINDOW_NOT_VISIBLE |
| node45 | C:/PROGRAM FILES/VMWARE/VMWARETOOLS/VMWAREUSER.EXE (1024) | IMAGE_CHANGED SURVIVE_REBOOT |
| node46 | C:/WINNT/EXPLORER.EXE (0) | |
| node47 | C:/WINNT/SYSTEM32/SVCHOST.EXE (460) | MALWARE_ACTION SMALL_IMAGE_SIZE WINDOW_NOT_VISIBLE SURVIVE_REBOOT ACTION_USED_NETWORK IS_SPAWNER |

TABLE A-continued (graph nodes of computer infected with the malware "Buttman").

| | | |
|---|---|---|
| node48 | E:/CLEANUP/GUI/ALERTMFC.EXE (580) | |
| node49 | C:/WINNT/SYSTEM32/SVCHOST.EXE (0) | SMALL_IMAGE_SIZE<br>SURVIVE_REBOOT |
| node50 | C:/PROGRAM FILES/SANASECURITY/PRIMARY RESPONSE/AGENT/BIN/SANASCANNER.EXE (836) | SMALL_IMAGE_SIZE<br>WINDOW_NOT_VISIBLE |
| node51 | C:/WINNT/SYSTEM32/REGSVC.EXE (512) | WINDOW_NOT_VISIBLE<br>SURVIVE_REBOOT |
| node52 | C:/WINNT/SYSTEM32/MSTASK.EXE (0) | SURVIVE_REBOOT |
| node53 | C:/PROGRAM FILES/SANASECURITY/PRIMARY RESPONSE/AGENT/BIN/SANAUI.EXE (1092) | SURVIVE_REBOOT<br>HAS_SHORTCUT_IN_START_MENU |
| node54 | C:/WINNT/SYSTEM32/SPOOLSV.EXE (0) | SMALL_IMAGE_SIZE<br>SURVIVE_REBOOT |
| node55 | C:/WINNT/SYSTEM32/LSASS.EXE (0) | SMALL_IMAGE_SIZE<br>SURVIVE_REBOOT |
| node56 | SYSTEM (8) | WINDOW_NOT_VISIBLE<br>IS_SPAWNER |
| node57 | C:/WINNT/SYSTEM32/WINLOGON.EXE (160) | WRITES_TO_WINDIR<br>WINDOW_NOT_VISIBLE<br>IS_SPAWNER |
| node58 | C:/WINNT/SYSTEM32/SVCHOST.EXE (704) | MALWARE_ACTION<br>SMALL_IMAGE_SIZE<br>WINDOW_NOT_VISIBLE<br>SURVIVE_REBOOT<br>ACTION_USED_NETWORK<br>IS_SPAWNER |

TABLE B (graph edges of computer infected with the malware "Buttman")

| Edge | Type |
|---|---|
| node1->node22 | INSTANCE_OF |
| node22->node1 | REGISTER |
| node22->node30 | INSTALL |
| node22->node17 | INSTALL |
| node7->node29 | INSTANCE_OF |
| node29->node15 | SPAWN |
| node29->node33 | SPAWN |
| node29->node48 | SPAWN |
| node42->node50 | INSTANCE_OF |
| node35->node53 | INSTANCE_OF |
| node4->node18 | INSTANCE_OF |
| node2->node41 | INSTANCE_OF |
| node6->node45 | INSTANCE_OF |
| node46->node43 | INSTANCE_OF |
| node43->node11 | REGISTER |
| node43->node22 | SPAWN |
| node43->node53 | SPAWN |
| node43->node41 | SPAWN |
| node43->node45 | SPAWN |
| node43->node25 | SPAWN |
| node43->node10 | SPAWN |
| node31->node15 | INSTANCE_OF |
| node31->node33 | INSTANCE_OF |
| node31->node25 | INSTANCE_OF |
| node31->node10 | INSTANCE_OF |
| node15->node39 | SPAWN |
| node33->node44 | SPAWN |
| node10->node29 | SPAWN |
| node5->node9 | INSTANCE_OF |
| node55->node26 | INSTANCE_OF |
| node52->node14 | INSTANCE_OF |
| node20->node44 | INSTANCE_OF |
| node16->node39 | INSTANCE_OF |
| node13->node51 | INSTANCE_OF |
| node12->node38 | INSTANCE_OF |
| node38->node18 | SPAWN |
| node38->node14 | SPAWN |
| node38->node51 | SPAWN |
| node38->node8 | SPAWN |
| node38->node32 | SPAWN |
| node38->node47 | SPAWN |
| node38->node58 | SPAWN |
| node38->node37 | SPAWN |
| node21->node36 | INSTANCE_OF |
| node36->node9 | SPAWN |
| node36->node57 | SPAWN |
| node54->node8 | INSTANCE_OF |
| node49->node32 | INSTANCE_OF |
| node49->node47 | INSTANCE_OF |
| node49->node58 | INSTANCE_OF |
| node58->node23 | SPAWN |
| node19->node37 | INSTANCE_OF |
| node40->node57 | INSTANCE_OF |
| node57->node26 | SPAWN |
| node57->node38 | SPAWN |
| node24->node23 | INSTANCE_OF |
| node3->node48 | INSTANCE_OF |
| node34->node27 | INSTANCE_OF |
| node27->node50 | SPAWN |
| node28->node56 | INSTANCE_OF |
| node56->node36 | SPAWN |

TABLE C (graph nodes related to the malware "Buttman")

| | | |
|---|---|---|
| node1 | C:/DOCUMENTS AND SETTINGS/ADMINISTRATOR/DESKTOP/TROJANEXECUTABLES/BACKDOOR.BUTTMAN.EXE (0) | SUFFICIENT<br>SURVIVE_REBOOT<br>TO_BE_CLEANED |
| node2 | C:/WINNT/ICQMAPI.DLL (0) | TO_BE_CLEANED |
| node3 | C:/DOCUMENTS AND SETTINGS/ADMINISTRATOR/DESKTOP/TROJANEXECUTABLES/BACKDOOR.BUTTMAN.EXE:620 (620) | KEYLOGGER_WINDOWS_HOOK<br>SUFFICIENT |

TABLE C-continued (graph nodes related to the malware "Buttman")

| | | |
|---|---|---|
| node4 | C:/WINNT/FNGKHLIB.DLL (0) | WRITES_TO_REGISTRY_STARTUP<br>SURVIVE_REBOOT<br>TO_BE_CLEANED<br>IS_TERMINATED<br>MALWARE_ACTION<br>CONFIRMED_MALWARE<br>WRITES_TO_WINDIR<br>WINDOW_NOT_VISIBLE<br>ALERTED_MALWARE<br>TO_BE_CLEANED |
| node5 | C:/WINNT/EXPLORER.EXE (896) | SUFFICIENT<br>WRITES_TO_REGISTRY_STARTUP<br>IS_SPAWNER<br>INSTALLS_TOOLBAR |

TABLE D (graph edges related to the malware "Buttman")

| | |
|---|---|
| node1->node3 | INSTANCE_OF |
| node3->node1 | REGISTER |
| node3->node4 | INSTALL |
| node3->node2 | INSTALL |
| node5->node3 | SPAWN |

TABLE E (graph nodes of computer infected with the malware "Lyricsdomain")

| | | |
|---|---|---|
| node1 | C:/PROGRAM FILES/VMWARE/VMWARETOOLS/VMWARETRAY.EXE (0) | IMAGE_CHANGED<br>SMALL_IMAGE_SIZE<br>SURVIVE_REBOOT |
| node2 | C:/PROGRAM FILES/VMWARE/VMWARETOOLS/VMWARESERVICE.EXE (0) | IMAGE_CHANGED<br>SURVIVE_REBOOT |
| node3 | C:/WINNT/SYSTEM32/CSRSS.EXE (0) | SMALL_IMAGE_SIZE |
| node4 | C:/PROGRAM FILES/INTERNET EXPLORER/IEXPLORE.EXE (0) | SUFFICIENT |
| node5 | C:/UNXUTILS/RM.EXE (624) | IS_TERMINATED |
| node6 | C:/PROGRAM FILES/VMWARE/VMWARETOOLS/VMWAREUSER.EXE (0) | IMAGE_CHANGED<br>SURVIVE_REBOOT |
| node7 | C:/WINNT/SYSTEM32/SPOOLSV.EXE (428) | SMALL_IMAGE_SIZE<br>WINDOW_NOT_VISIBLE<br>SURVIVE_REBOOT |
| node8 | C:/DOCUMENTS AND SETTINGS/ADMINISTRATOR/LOCAL SETTINGS/TEMP/HEKXSVY.EXE (0) | TO_BE_CLEANED |
| node9 | C:/WINNT/SYSTEM32/CSRSS.EXE (164) | SMALL_IMAGE_SIZE<br>WINDOW_NOT_VISIBLE |
| node10 | C:/WINNT/SYSTEM32/CMD.EXE (840) | HAS_SHORTCUT_IN_START_MENU<br>IS_SPAWNER |
| node11 | C:/DOCUMENTS AND SETTINGS/ADMINISTRATOR/LOCAL SETTINGS/TEMPORARYINTERNET FILES/CONTENT.IE5/XYZI1KFG/ISTDOWNLOAD[1].EXE (0) | |
| node12 | C:/WINNT/SYSTEM32/BROWSEUI.DLL (0) | |
| node13 | C:/WINNT/SYSTEM32/SERVICES.EXE (0) | SURVIVE_REBOOT |
| node14 | C:/PROGRAM FILES/INTERNET EXPLORER/IEXPLORE.EXE (1056) | INSTALLS_COM_OBJECT<br>SUFFICIENT<br>ACTION_USED_NETWORK<br>IS_SPAWNER<br>IS_TERMINATED<br>MALWARE_ACTION<br>INSTALLS_TOOLBAR<br>HAS_SHORTCUT_IN_START_MENU |
| node15 | C:/WINNT/SYSTEM32/PSSUSPEND.EXE (0) | |
| node16 | C:/PROGRAM FILES/VMWARE/VMWARETOOLS/VMWARESERVICE.EXE (668) | IMAGE_CHANGED<br>WINDOW_NOT_VISIBLE<br>SURVIVE_REBOOT |
| node17 | C:/DOCUMENTS AND SETTINGS/ADMINISTRATOR/LOCAL SETTINGS/TEMP/ICD1.TMP/YSBACTIVEX.DLL (0) | |
| node18 | C:/DOCUMENTS AND SETTINGS/ADMINISTRATOR/LOCAL SETTINGS/TEMPORARYINTERNET FILES/CONTENT.IE5/ISTCD2OD/SACC.PROD.V1110.07SEP2005.EXE (0) | TO_BE_CLEANED |
| node19 | C:/WINNT/SYSTEM32/PSKILL.EXE (0) | |

TABLE E-continued (graph nodes of computer infected with the malware "Lyricsdomain")

| | | |
|---|---|---|
| node20 | C:/WINNT/SYSTEM32/CMD.EXE (1176) | HAS_SHORTCUT_IN_START_MENU IS_SPAWNER |
| node21 | C:/WINNT/SYSTEM32/LSASS.EXE (224) | MALWARE_ACTION SMALL_IMAGE_SIZE WINDOW_NOT_VISIBLE SURVIVE_REBOOT ACTION_USED_NETWORK |
| node22 | C:/WINNT/HEKXSVY.EXE (0) | SUFFICIENT SMALL_IMAGE_SIZE SURVIVE_REBOOT TO_BE_CLEANED |
| node23 | SYSTEM (0) | |
| node24 | E:/CLEANUP/GUI/ALERTMFC.EXE (1180) | IS_TERMINATED |
| node25 | C:/WINNT/SYSTEM32/CMD.EXE (0) | |
| node26 | C:/PROGRAM FILES/YOURSITEBAR/YSB.DLL (0) | TO_BE_CLEANED |
| node27 | C:/PROGRAM FILES/SANASECURITY/PRIMARY RESPONSE/AGENT/BIN/SANAUI.EXE (0) | SURVIVE_REBOOT |
| node28 | C:/WINNT/SYSTEM32/SMSS.EXE (140) | SMALL_IMAGE_SIZE WINDOW_NOT_VISIBLE IS_SPAWNER |
| node29 | C:/WINNT/SYSTEM32/SERVICES.EXE (212) | TERMINATE_PROCESS MALWARE_ACTION WINDOW_NOT_VISIBLE SURVIVE_REBOOT ACTION_USED_NETWORK IS_SPAWNER |
| node30 | C:/WINNT/SYSTEM32/PSSUSPEND.EXE (1104) | IS_TERMINATED MALWARE_ACTION TERMINATE_PROCESS WINDOW_NOT_VISIBLE |
| node31 | E:/CLEANUP/ENUM.EXE (1144) | SMALL_IMAGE_SIZE IS_TERMINATED WINDOW_NOT_VISIBLE |
| node32 | C:/WINNT/HEKXSVY.EXE (1144) | SMALL_IMAGE_SIZE SUFFICIENT WRITES_TO_REGISTRY_STARTUP SURVIVE_REBOOT TO_BE_CLEANED IS_TERMINATED WINDOW_NOT_VISIBLE ALERTED_MALWARE |
| node33 | C:/WINNT/SYSTEM32/WINLOGON.EXE (0) | |
| node34 | C:/PROGRAM FILES/VMWARE/VMWARETOOLS/VMWARETRAY.EXE (1016) | SMALL_IMAGE_SIZE IMAGE_CHANGED WINDOW_NOT_VISIBLE SURVIVE_REBOOT |
| node35 | C:/WINNT/SYSTEM32/CMD.EXE (1144) | IS_SPAWNER IS_TERMINATED MALWARE_ACTION TERMINATE_PROCESS HAS_SHORTCUT_IN_START_MENU |
| node36 | C:/PROGRAM FILES/ISTSVC/ISTSVC.EXE (0) | SUFFICIENT SMALL_IMAGE_SIZE SURVIVE_REBOOT TO_BE_CLEANED |
| node37 | C:/WINNT/EXPLORER.EXE (896) | WRITES_TO_REGISTRY_STARTUP IS_SPAWNER |
| node38 | C:/PERL/BIN/PERL.EXE (1080) | SMALL_IMAGE_SIZE IS_SPAWNER IS_TERMINATED WRITES_TO_WINDIR |
| node39 | C:/WINNT/SYSTEM32/CMD.EXE (1188) | IS_SPAWNER IS_TERMINATED MALWARE_ACTION TERMINATE_PROCESS HAS_SHORTCUT_IN_START_MENU |
| node40 | C:/WINNT/EXPLORER.EXE (0) | |
| node41 | C:/PROGRAM FILES/VMWARE/VMWARETOOLS/VMWAREUSER.EXE (1024) | IMAGE_CHANGED SURVIVE_REBOOT |
| node42 | C:/WINNT/SYSTEM32/SVCHOST.EXE (460) | MALWARE_ACTION SMALL_IMAGE_SIZE WINDOW_NOT_VISIBLE SURVIVE_REBOOT |

TABLE E-continued (graph nodes of computer infected with the malware "Lyricsdomain")

| Node | Path | Attributes |
|---|---|---|
| | | ACTION_USED_NETWORK |
| | | IS_SPAWNER |
| node43 | C:/PROGRAM FILES/SANASECURITY/ PRIMARY RESPONSE/AGENT/BIN/SANASCANNER.EXE (836) | SMALL_IMAGE_SIZE WINDOW_NOT_VISIBLE |
| node44 | C:/UNXUTILS/RM.EXE (0) | |
| node45 | E:/CLEANUP/ENUM.EXE (0) | SMALL_IMAGE_SIZE |
| node46 | C:/WINNT/SYSTEM32/REGSVC.EXE (512) | WINDOW_NOT_VISIBLE SURVIVE_REBOOT |
| node47 | C:/PROGRAM FILES/SANASECURITY/PRIMARY RESPONSE/AGENT/BIN/SANAUI.EXE (1092) | SURVIVE_REBOOT HAS_SHORTCUT_IN_START_MENU SUFFICIENT |
| node48 | C:/DOCUMENTS AND SETTINGS/ADMINISTRATOR/LOCAL SETTINGS/TEMP/IINSTALL.EXE (0) | SMALL_IMAGE_SIZE TO_BE_CLEANED |
| node49 | C:/PROGRAM FILES/ISTSVC/ISTSVC.EXE:860 (860) | SMALL_IMAGE_SIZE SUFFICIENT WRITES_TO_REGISTRY_STARTUP SURVIVE_REBOOT TO_BE_CLEANED ACTION_USED_NETWORK IS_TERMINATED MALWARE_ACTION CONFIRMED_MALWARE WINDOW_NOT_VISIBLE ALERTED_MALWARE |
| node50 | C:/WINNT/SYSTEM32/PSSUSPEND.EXE (976) | IS_TERMINATED WINDOW_NOT_VISIBLE |
| node51 | C:/WINNT/SYSTEM32/LSASS.EXE (0) | SMALL_IMAGE_SIZE SURVIVE_REBOOT |
| node52 | SYSTEM (8) | WINDOW_NOT_VISIBLE IS_SPAWNER |
| node53 | C:/WINNT/SYSTEM32/WINLOGON.EXE (160) | WRITES_TO_WINDIR WINDOW_NOT_VISIBLE IS_SPAWNER |
| node54 | C:/DOCUMENTS AND SETTINGS/ADMINISTRATOR/LOCAL SETTINGS/TEMP/SACC.EXE(0) | TO_BE_CLEANED |
| node55 | E:/CLEANUP/GUI/ALERTMFC.EXE (0) | |
| node56 | C:/WINNT/SYSTEM32/CMD.EXE (648) | IS_SPAWNER IS_TERMINATED HAS_SHORTCUT_IN_START_MENU |
| node57 | C:/DOCUMENTS AND SETTINGS/ADMINISTRATOR/LOCAL SETTINGS/TEMPORARY INTERNET FILES/CONTENT.IE5/N3SNISZ6/ISTRECOVER[1].EXE (0) | TO_BE_CLEANED |
| node58 | C:/PERL/BIN/PERL.EXE (0) | SMALL_IMAGE_SIZE |
| node59 | C:/DOCUMENTS AND SETTINGS/ADMINISTRATOR/LOCAL SETTINGS/ TEMPORARY INTERNET FILES/CONTENT.IE5/AH6GBXDE/YSB[1].DLL (0) | TO_BE_CLEANED |
| node60 | E:/CLEANUP/ENUM.EXE (820) | SMALL_IMAGE_SIZE IS_TERMINATED WINDOW_NOT_VISIBLE |
| node61 | C:/WINNT/SYSTEM32/PSKILL.EXE (1192) | IS_TERMINATED MALWARE_ACTION TERMINATE_PROCESS WINDOW_NOT_VISIBLE |
| node62 | C:/DOCUMENTS AND SETTINGS/ADMINISTRATOR/LOCAL SETTINGS/TEMP/YSB.DLL (0) | TO_BE_CLEANED |
| node63 | C:/WINNT/SYSTEM32/REGSVC.EXE (0) | SURVIVE_REBOOT |
| node64 | C:/WINNT/SYSTEM32/MSTASK.EXE (528) | MALWARE_ACTION WINDOW_NOT_VISIBLE SURVIVE_REBOOT ACTION_USED_NETWORK |
| node65 | C:/DOCUMENTS AND SETTINGS/ADMINISTRATOR/LOCAL SETTINGS/ TEMPORARY INTERNET FILES/CONTENT.IE5/ISTCD2OD/ISTSVC[1].EXE (0) | TO_BE_CLEANED |
| node66 | C:/WINNT/SYSTEM32/WBEM/WINMGMT.EXE (0) | SURVIVE_REBOOT |
| node67 | C:/WINNT/SYSTEM32/CMD.EXE (756) | IS_SPAWNER IS_TERMINATED MALWARE_ACTION TERMINATE_PROCESS HAS_SHORTCUT_IN_START_MENU |
| node68 | C:/WINNT/SYSTEM32/SMSS.EXE (0) | SMALL_IMAGE_SIZE |
| node69 | C:/WINNT/SYSTEM32/WUAUCLT.EXE (844) | WINDOW_NOT_VISIBLE |
| node70 | C:/WINNT/SYSTEM32/WUAUCLT.EXE (0) | |
| node71 | C:/DOCUMENTS AND SETTINGS/ADMINISTRATOR/ LOCAL SETTINGS/TEMP/ISTSVC.EXE (0) | TO_BE_CLEANED |

TABLE E-continued (graph nodes of computer infected with the malware "Lyricsdomain")

| | | |
|---|---|---|
| node72 | C:/WINNT/SYSTEM32/CMD.EXE (1192) | IS_SPAWNER<br>IS_TERMINATED<br>MALWARE_ACTION<br>TERMINATE_PROCESS<br>HAS_SHORTCUT_IN_START_MENU |
| node73 | C:/WINNT/SYSTEM32/PSKILL.EXE (1104) | IS_TERMINATED<br>MALWARE_ACTION<br>TERMINATE_PROCESS<br>WINDOW_NOT_VISIBLE |
| node74 | SANAAGENT.EXE (1052) | |
| node75 | C:/WINNT/SYSTEM32/SVCHOST.EXE (400) | MALWARE_ACTION<br>SMALL_IMAGE_SIZE<br>WINDOW_NOT_VISIBLE<br>SURVIVE_REBOOT<br>ACTION_USED_NETWORK<br>IS_SPAWNER |
| node76 | SANAAGENT.EXE (0) | |
| node77 | C:/WINNT/SYSTEM32/WBEM/WINMGMT.EXE (692) | WINDOW_NOT_VISIBLE<br>SURVIVE_REBOOT<br>IS_SPAWNER |
| node78 | C:/PERL/BIN/PERL.EXE (636) | SMALL_IMAGE_SIZE<br>WRITES_TO_PGM_FILES<br>WRITES_TO_WINDIR<br>WRITES_TO_REGISTRY_STARTUP<br>IS_SPAWNER |
| node79 | C:/WINNT/SYSTEM32/PSKILL.EXE (1188) | IS_TERMINATED<br>MALWARE_ACTION<br>TERMINATE_PROCESS<br>WINDOW_NOT_VISIBLE<br>SMALL_IMAGE_SIZE |
| node80 | C:/PROGRAM FILES/SANASECURITY/PRIMARY RESPONSE/AGENT/BIN/SANASCANNER.EXE (0) | |
| node81 | C:/PROGRAM FILES/WINRAR/WINRAR.EXE (640) | IS_TERMINATED<br>WINDOW_NOT_VISIBLE<br>HAS_SHORTCUT_IN_START_MENU<br>SMALL_IMAGE_SIZE<br>SURVIVE_REBOOT |
| node82 | C:/WINNT/SYSTEM32/SVCHOST.EXE (0) | |
| node83 | C:/PROGRAM FILES/WINRAR/WINRAR.EXE (0) | |
| node84 | C:/DOCUMENTS AND SETTINGS/ADMINISTRATOR/LOCAL SETTINGS/TEMP/IINSTALL.EXE:764 (764) | INSTALLS_COM_OBJECT<br>SMALL_IMAGE_SIZE<br>WRITES_TO_PGM_FILES<br>SUFFICIENT<br>WRITES_TO_REGISTRY_STARTUP<br>TO_BE_CLEANED<br>ACTION_USED_NETWORK<br>IS_SPAWNER<br>IS_TERMINATED<br>MALWARE_ACTION<br>CONFIRMED_MALWARE<br>WRITES_TO_WINDIR<br>WINDOW_NOT_VISIBLE<br>ALERTED_MALWARE<br>INSTALLS_TOOLBAR<br>SURVIVE_REBOOT |
| node85 | C:/WINNT/SYSTEM32/MSTASK.EXE (0) | |
| node86 | C:/WINNT/DOWNLOADED PROGRAM FILES/YSBACTIVEX.DLL (0) | |
| node87 | C:/WINNT/SYSTEM32/SPOOLSV.EXE (0) | SMALL_IMAGE_SIZE<br>SURVIVE_REBOOT |
| node88 | C:/WINNT/SYSTEM32/SVCHOST.EXE (704) | MALWARE_ACTION<br>SMALL_IMAGE_SIZE<br>WINDOW_NOT_VISIBLE<br>SURVIVE_REBOOT<br>ACTION_USED_NETWORK<br>IS_SPAWNER |

TABLE F (graph edges of computer infected with the malware "Lyricsdomain")

| | |
|---|---|
| node48->node84 | INSTANCE_OF |
| node84->node8 | INSTALL |
| node84->node71 | INSTALL |
| node84->node54 | INSTALL |
| node84->node62 | INSTALL |
| node84->node59 | INSTALL |
| node84->node65 | INSTALL |
| node84->node18 | INSTALL |
| node84->node57 | INSTALL |
| node84->node36 | INSTALL |

TABLE F-continued (graph edges of computer infected with the malware "Lyricsdomain")

| | |
|---|---|
| node84->node49 | SPAWN |
| node84->node26 | REGISTER |
| node84->node26 | INSTALL |
| node84->node22 | INSTALL |
| node84->node32 | SPAWN |
| node58->node38 | INSTANCE_OF |
| node58->node78 | INSTANCE_OF |
| node78->node35 | SPAWN |
| node78->node39 | SPAWN |
| node78->node72 | SPAWN |
| node78->node56 | SPAWN |
| node78->node67 | SPAWN |
| node78->node31 | SPAWN |
| node78->node60 | SPAWN |
| node78->node24 | SPAWN |
| node4->node14 | INSTANCE_OF |
| node14->node12 | REGISTER |
| node14->node17 | INSTALL |
| node14->node48 | INSTALL |
| node14->node84 | SPAWN |
| node14->node11 | INSTALL |
| node14->node26 | REGISTER |
| node14->node86 | REGISTER |
| node36->node49 | INSTANCE_OF |
| node49->node36 | REGISTER |
| node80->node43 | INSTANCE_OF |
| node27->node47 | INSTANCE_OF |
| node2->node16 | INSTANCE_OF |
| node1->node34 | INSTANCE_OF |
| node6->node41 | INSTANCE_OF |
| node83->node81 | INSTANCE_OF |
| node44->node5 | INSTANCE_OF |
| node40->node37 | INSTANCE_OF |
| node37->node14 | SPAWN |
| node37->node47 | SPAWN |
| node37->node34 | SPAWN |
| node37->node41 | SPAWN |
| node37->node81 | SPAWN |
| node37->node20 | SPAWN |
| node37->node10 | SPAWN |
| node22->node32 | INSTANCE_OF |
| node32->node22 | REGISTER |
| node25->node35 | INSTANCE_OF |
| node25->node20 | INSTANCE_OF |
| node25->node39 | INSTANCE_OF |
| node25->node72 | INSTANCE_OF |
| node25->node56 | INSTANCE_OF |
| node25->node67 | INSTANCE_OF |
| node25->node10 | INSTANCE_OF |
| node35->node79 | SPAWN |
| node39->node61 | SPAWN |
| node72->node73 | SPAWN |
| node72->node30 | SPAWN |
| node56->node50 | SPAWN |
| node67->node61 | SPAWN |
| node10->node38 | SPAWN |
| node10->node78 | SPAWN |
| node10->node5 | SPAWN |
| node3->node9 | INSTANCE_OF |
| node51->node21 | INSTANCE_OF |
| node85->node64 | INSTANCE_OF |
| node19->node73 | INSTANCE_OF |
| node19->node79 | INSTANCE_OF |
| node19->node61 | INSTANCE_OF |
| node15->node30 | INSTANCE_OF |
| node15->node50 | INSTANCE_OF |
| node63->node46 | INSTANCE_OF |
| node13->node29 | INSTANCE_OF |
| node29->node16 | SPAWN |
| node29->node64 | SPAWN |
| node29->node46 | SPAWN |
| node29->node7 | SPAWN |
| node29->node75 | SPAWN |
| node29->node42 | SPAWN |
| node29->node88 | SPAWN |
| node29->node77 | SPAWN |
| node68->node28 | INSTANCE_OF |
| node28->node9 | SPAWN |
| node28->node53 | SPAWN |
| node87->node7 | INSTANCE_OF |
| node82->node75 | INSTANCE_OF |
| node82->node42 | INSTANCE_OF |
| node82->node88 | INSTANCE_OF |
| node88->node69 | SPAWN |
| node66->node77 | INSTANCE_OF |
| node33->node53 | INSTANCE_OF |
| node53->node21 | SPAWN |
| node53->node29 | SPAWN |
| node70->node69 | INSTANCE_OF |
| node45->node31 | INSTANCE_OF |
| node45->node60 | INSTANCE_OF |
| node55->node24 | INSTANCE_OF |
| node76->node74 | INSTANCE_OF |
| node74->node43 | SPAWN |
| node23->node52 | INSTANCE_OF |
| node52->node28 | SPAWN |

TABLE G (graph nodes related to the malware "Lyricsdomain")

| | | |
|---|---|---|
| node1 | C:/DOCUMENTS AND SETTINGS/ADMINISTRATOR/LOCAL SETTINGS/TEMP/HEKXSVY.EXE (0) | TO_BE_CLEANED |
| node2 | C:/DOCUMENTS AND SETTINGS/ADMINISTRATOR/LOCAL SETTINGS/TEMPORARY INTERNET FILES/CONTENT.IE5/ISTCD2OD/SACC.PROD.V1110.07SEP2005.EXE (0) | TO_BE_CLEANED |
| node3 | C:/WINNT/HEKXSVY.EXE (0) | SUFFICIENT<br>SMALL_IMAGE_SIZE<br>SURVIVE_REBOOT<br>TO_BE_CLEANED |
| node4 | C:/PROGRAM FILES/YOURSITEBAR/YSB.DLL (0) | TO_BE_CLEANED |
| node5 | C:/WINNT/HEKXSVY.EXE (1144) | SMALL_IMAGE_SIZE<br>SUFFICIENT<br>WRITES_TO_REGISTRY_STARTUP<br>SURVIVE_REBOOT<br>TO_BE_CLEANED<br>IS_TERMINATED<br>WINDOW_NOT_VISIBLE<br>ALERTED_MALWARE |
| node6 | C:/PROGRAM FILES/ISTSVC/ISTSVC.EXE (0) | SUFFICIENT<br>SMALL_IMAGE_SIZE<br>SURVIVE_REBOOT<br>TO_BE_CLEANED |

TABLE G-continued (graph nodes related to the malware "Lyricsdomain")

| | | |
|---|---|---|
| node7 | C:/DOCUMENTS AND SETTINGS/ADMINISTRATOR/LOCAL SETTINGS/ TEMP/IINSTALL.EXE (0) | SUFFICIENT SMALL_IMAGE_SIZE TO_BE_CLEANED |
| node8 | C:/PROGRAM FILES/ISTSVC/ISTSVC.EXE:860 (860) | SMALL_IMAGE_SIZE SUFFICIENT WRITES_TO_REGISTRY_STARTUP SURVIVE_REBOOT TO_BE_CLEANED ACTION_USED_NETWORK IS_TERMINATED MALWARE_ACTION CONFIRMED_MALWARE WINDOW_NOT_VISIBLE ALERTED_MALWARE |
| node9 | C:/DOCUMENTS AND SETTINGS/ADMINISTRATOR/ LOCAL SETTINGS/TEMP/SACC.EXE (0) | TO_BE_CLEANED |
| node10 | C:/DOCUMENTS AND SETTINGS/ADMINISTRATOR/LOCAL SETTINGS/ TEMPORARY INTERNET FILES/CONTENT.IE5/N3SNISZ6/ISTRECOVER[1].EXE (0) | TO_BE_CLEANED |
| node11 | C:/DOCUMENTS AND SETTINGS/ADMINISTRATOR/LOCAL SETTINGS/ TEMPORARY INTERNET FILES/CONTENT.IE5/AH6GBXDE/YSB[1].DLL (0) | TO_BE_CLEANED |
| node12 | C:/DOCUMENTS AND SETTINGS/ADMINISTRATOR/LOCAL SETTINGS/ TEMP/YSB.DLL (0) | TO_BE_CLEANED |
| node13 | C:/DOCUMENTS AND SETTINGS/ADMINISTRATOR/LOCAL SETTINGS/ TEMPORARY INTERNET FILES/CONTENT.IE5/ISTCD2OD/ISTSVC[1].EXE (0) | TO_BE_CLEANED |
| node14 | C:/DOCUMENTS AND SETTINGS/ADMINISTRATOR/LOCAL SETTINGS/ TEMP/ISTSVC.EXE(0) | TO_BE_CLEANED |
| node15 | C:/DOCUMENTS AND SETTINGS/ADMINISTRATOR/LOCAL SETTINGS/TEMP/IINSTALL.EXE:764(764) | INSTALLS_COM_OBJECT SMALL_IMAGE_SIZE WRITES_TO_PGM_FILES SUFFICIENT WRITES_TO_REGISTRY_STARTUP TO_BE_CLEANED ACTION_USED_NETWORK IS_SPAWNER IS_TERMINATED MALWARE_ACTION CONFIRMED_MALWARE WRITES_TO_WINDIR WINDOW_NOT_VISIBLE ALERTED_MALWARE INSTALLS_TOOLBAR |
| node16 | C:/PROGRAM FILES/INTERNET EXPLORER/IEXPLORE.EXE (1056) | INSTALLS_COM_OBJECT SUFFICIENT ACTION_USED_NETWORK IS_SPAWNER IS_TERMINATED MALWARE_ACTION INSTALLS_TOOLBAR HAS_SHORTCUT_IN_START_MENU |

TABLE H (graph edges related to the malware "Lyricsdomain")

| | |
|---|---|
| node7->node15 | INSTANCE_OF |
| node15->node1 | INSTALL |
| node15->node14 | INSTALL |
| node15->node9 | INSTALL |
| node15->node12 | INSTALL |
| node15->node11 | INSTALL |
| node15->node13 | INSTALL |
| node15->node2 | INSTALL |
| node15->node10 | INSTALL |
| node15->node6 | INSTALL |
| node15->node8 | SPAWN |
| node15->node4 | REGISTER |
| node15->node4 | INSTALL |
| node15->node3 | INSTALL |
| node15->node5 | SPAWN |
| node16->node7 | INSTALL |
| node16->node15 | SPAWN |
| node16->node4 | REGISTER |
| node6->node8 | INSTANCE_OF |
| node8->node6 | REGISTER |
| node3->node5 | INSTANCE_OF |
| node5->node3 | REGISTER |

TABLE I (graph nodes of computer infected with the malware "Nuclearrat")

| | | |
|---|---|---|
| node1 | C:/PROGRAM FILES/VMWARE/VMWARETOOLS/VMWARETRAY.EXE (0) | IMAGE_CHANGED SMALL_IMAGE_SIZE SURVIVE_REBOOT |

TABLE I-continued (graph nodes of computer infected with the malware "Nuclearrat")

| | | |
|---|---|---|
| node2 | C:/PROGRAM FILES/VMWARE/VMWARETOOLS/VMWARESERVICE.EXE (0) | IMAGE_CHANGED<br>SURVIVE_REBOOT |
| node3 | C:/WINNT/SYSTEM32/CSRSS.EXE (0) | SMALL_IMAGE_SIZE |
| node4 | C:/WINNT/NR/EXAMPLE.DLL (0) | TO_BE_CLEANED |
| node5 | C:/PROGRAM FILES/INTERNET EXPLORER/IEXPLORE.EXE (0) | |
| node6 | C:/PROGRAM FILES/VMWARE/VMWARETOOLS/VMWAREUSER.EXE (0) | IMAGE_CHANGED<br>SURVIVE_REBOOT |
| node7 | C:/WINNT/SYSTEM32/CMD.EXE (1028) | TO_BE_CLEANED<br>IS_SPAWNER<br>IS_TERMINATED<br>HAS_SHORTCUT_IN_START_MENU |
| node8 | C:/WINNT/SYSTEM32/SPOOLSV.EXE (428) | SMALL_IMAGE_SIZE<br>WINDOW_NOT_VISIBLE<br>SURVIVE_REBOOT |
| node9 | E:/CLEANUP/GUI/ALERTMFC.EXE (1000) | |
| node10 | C:/WINNT/SYSTEM32/CSRSS.EXE (164) | SMALL_IMAGE_SIZE<br>WINDOW_NOT_VISIBLE |
| node11 | C:/WINNT/SYSTEM32/CMD.EXE (840) | HAS_SHORTCUT_IN_START_MENU<br>IS_SPAWNER |
| node12 | C:/WINNT/SYSTEM32/BROWSEUI.DLL (0) | |
| node13 | C:/WINNT/NR/EXAMPLE.EXE (0) | SUFFICIENT<br>SURVIVE_REBOOT<br>TO_BE_CLEANED |
| node14 | C:/WINNT/SYSTEM32/SERVICES.EXE (0) | SURVIVE_REBOOT |
| node15 | C:/WINNT/SYSTEM32/PSSUSPEND.EXE (0) | |
| node16 | C:/PROGRAM FILES/VMWARE/VMWARETOOLS/VMWARESERVICE.EXE (668) | IMAGE_CHANGED<br>WINDOW_NOT_VISIBLE<br>SURVIVE_REBOOT |
| node17 | C:/WINNT/SYSTEM32/PSKILL.EXE (0) | |
| node18 | C:/WINNT/SYSTEM32/PSKILL.EXE (724) | IS_TERMINATED<br>MALWARE_ACTION<br>TERMINATE_PROCESS<br>WINDOW_NOT_VISIBLE |
| node19 | C:/DOCUMENTS AND SETTINGS/ADMINISTRATOR/DESKTOP/TROJANEXECUTABLES/NUCLEARRATALL.EXE (0) | SUFFICIENT<br>TO_BE_CLEANED |
| node20 | C:/WINNT/SYSTEM32/CMD.EXE (1176) | HAS_SHORTCUT_IN_START_MENU<br>IS_SPAWNER |
| node21 | C:/WINNT/SYSTEM32/LSASS.EXE (224) | MALWARE_ACTION<br>SMALL_IMAGE_SIZE<br>WINDOW_NOT_VISIBLE<br>SURVIVE_REBOOT<br>ACTION_USED_NETWORK |
| node22 | C:/WINNT/SYSTEM32/CMD.EXE (376) | IS_SPAWNER<br>IS_TERMINATED<br>MALWARE_ACTION<br>TERMINATE_PROCESS<br>HAS_SHORTCUT_IN_START_MENU |
| node23 | SYSTEM (0) | |
| node24 | C:/WINNT/SYSTEM32/CMD.EXE (0) | |
| node25 | C:/PROGRAM FILES/SANASECURITY/PRIMARY RESPONSE/AGENT/BIN/SANAUI.EXE (0) | SURVIVE_REBOOT |
| node26 | C:/WINNT/SYSTEM32/SMSS.EXE (140) | SMALL_IMAGE_SIZE<br>WINDOW_NOT_VISIBLE<br>IS_SPAWNER |
| node27 | C:/WINNT/SYSTEM32/SERVICES.EXE (212) | TERMINATE_PROCESS<br>MALWARE_ACTION<br>WINDOW_NOT_VISIBLE<br>SURVIVE_REBOOT<br>ACTION_USED_NETWORK<br>IS_SPAWNER |
| node28 | C:/WINNT/SYSTEM32/PSSUSPEND.EXE (724) | IS_TERMINATED<br>MALWARE_ACTION<br>TERMINATE_PROCESS<br>WINDOW_NOT_VISIBLE |
| node29 | C:/WINNT/SYSTEM32/WINLOGON.EXE (0) | |

TABLE I-continued (graph nodes of computer infected with the malware "Nuclearrat")

| | | |
|---|---|---|
| node30 | C:/PROGRAM FILES/VMWARE/VMWARETOOLS/VMWARETRAY.EXE (1016) | SMALL_IMAGE_SIZE<br>IMAGE_CHANGED<br>WINDOW_NOT_VISIBLE<br>SURVIVE_REBOOT |
| node31 | C:/PROGRAM FILES/INTERNET EXPLORER/IEXPLORE.EXE (1004) | TO_BE_CLEANED<br>ACTION_USED_NETWORK<br>IS_TERMINATED<br>MALWARE_ACTION<br>WINDOW_NOT_VISIBLE<br>TAINTED_MALWARE<br>PROCESS_MEMORY_COMPROMISED<br>PARENT_SURVIVED_REBOOT |
| node32 | E:/CLEANUP/ENUM.EXE (620) | SMALL_IMAGE_SIZE<br>IS_TERMINATED<br>IMAGE_CHANGED<br>WINDOW_NOT_VISIBLE |
| node33 | C:/WINNT/EXPLORER.EXE (896) | SUFFICIENT<br>WRITES_TO_REGISTRY_STARTUP<br>IS_SPAWNER<br>INSTALLS_TOOLBAR |
| node34 | C:/PROGRAM FILES/VMWARE/VMWARETOOLS/VMWAREUSER.EXE (1024) | IMAGE_CHANGED<br>SURVIVE_REBOOT |
| node35 | C:/WINNT/EXPLORER.EXE (0) | |
| node36 | C:/WINNT/SYSTEM32/SVCHOST.EXE (460) | MALWARE_ACTION<br>SMALL_IMAGE_SIZE<br>WINDOW_NOT_VISIBLE<br>SURVIVE_REBOOT<br>ACTION_USED_NETWORK<br>IS_SPAWNER |
| node37 | E:/CLEANUP/ENUM.EXE (0) | IMAGE_CHANGED<br>SMALL_IMAGE_SIZE |
| node38 | C:/PERL/BIN/PERL.EXE (1128) | SMALL_IMAGE_SIZE<br>WRITES_TO_WINDIR<br>WRITES_TO_REGISTRY_STARTUP<br>IS_SPAWNER |
| node39 | C:/WINNT/SYSTEM32/REGSVC.EXE (512) | WINDOW_NOT_VISIBLE<br>SURVIVE_REBOOT |
| node40 | C:/PROGRAM FILES/SANASECURITY/PRIMARY RESPONSE/AGENT/BIN/SANAUI.EXE (1092) | SURVIVE_REBOOT<br>HAS_SHORTCUT_IN_START_MENU |
| node41 | C:/WINNT/SYSTEM32/LSASS.EXE (0) | SMALL_IMAGE_SIZE<br>SURVIVE_REBOOT |
| node42 | SYSTEM (8) | WINDOW_NOT_VISIBLE<br>IS_SPAWNER |
| node43 | C:/WINNT/SYSTEM32/WINLOGON.EXE (160) | WRITES_TO_WINDIR<br>WINDOW_NOT_VISIBLE<br>IS_SPAWNER |
| node44 | E:/CLEANUP/GUI/ALERTMFC.EXE (0) | |
| node45 | C:/PERL/BIN/PERL.EXE (0) | SMALL_IMAGE_SIZE |
| node46 | C:/DOCUMENTS AND SETTINGS/ADMINISTRATOR/DESKTOP/TROJANEXECUTABLES/NUCLEARRATALL.EXE(376) | SUFFICIENT<br>TO_BE_CLEANED<br>IS_SPAWNER<br>IS_TERMINATED<br>CONFIRMED_MALWARE<br>WRITES_TO_WINDIR<br>WINDOW_NOT_VISIBLE<br>ALERTED_MALWARE |
| node47 | C:/WINNT/SYSTEM32/PSSUSPEND.EXE (1084) | IS_TERMINATED<br>WINDOW_NOT_VISIBLE |
| node48 | C:/WINNT/SYSTEM32/REGSVC.EXE (0) | SURVIVE_REBOOT |
| node49 | C:/WINNT/SYSTEM32/MSTASK.EXE (528) | MALWARE_ACTION<br>WINDOW_NOT_VISIBLE<br>SURVIVE_REBOOT<br>ACTION_USED_NETWORK |
| node50 | C:/WINNT/SYSTEM32/WBEM/WINMGMT.EXE (0) | SURVIVE_REBOOT |
| node51 | C:/WINNT/SYSTEM32/SMSS.EXE (0) | SMALL_IMAGE_SIZE |
| node52 | C:/WINNT/NR/EXAMPLE.EXE:1000 (1000) | SUFFICIENT<br>WRITES_TO_REGISTRY_STARTUP<br>SURVIVE_REBOOT<br>TO_BE_CLEANED<br>IS_SPAWNER<br>IS_TERMINATED<br>P2P_CODE_INJECTION<br>MALWARE_ACTION |

TABLE I-continued (graph nodes of computer infected with the malware "Nuclearrat")

| | | |
|---|---|---|
| | | CONFIRMED_MALWARE<br>WRITES_TO_WINDIR<br>WINDOW_NOT_VISIBLE<br>ALERTED_MALWARE |
| node53 | C:/WINNT/SYSTEM32/WUAUCLT.EXE (0) | |
| node54 | C:/WINNT/SYSTEM32/WUAUCLT.EXE (844) | WINDOW_NOT_VISIBLE |
| node55 | C:/WINNT/SYSTEM32/CMD.EXE (620) | IS_SPAWNER<br>IS_TERMINATED<br>HAS_SHORTCUT_IN_START_MENU |
| node56 | C:/WINNT/SYSTEM32/SVCHOST.EXE (400) | MALWARE_ACTION<br>SMALL_IMAGE_SIZE<br>WINDOW_NOT_VISIBLE<br>SURVIVE_REBOOT<br>ACTION_USED_NETWORK<br>IS_SPAWNER |
| node57 | SANAAGENT.EXE (0) | |
| node58 | C:/WINNT/SYSTEM32/WBEM/WINMGMT.EXE (692) | WINDOW_NOT_VISIBLE<br>SURVIVE_REBOOT<br>IS_SPAWNER |
| node59 | SANAAGENT.EXE (464) | |
| node60 | C:/PROGRAM FILES/SANASECURITY/PRIMARY RESPONSE/AGENT/BIN/SANASCANNER.EXE (656) | SMALL_IMAGE_SIZE<br>WINDOW_NOT_VISIBLE |
| node61 | C:/PROGRAM FILES/SANASECURITY/PRIMARY RESPONSE/AGENT/BIN/SANASCANNER.EXE (0) | SMALL_IMAGE_SIZE |
| node62 | C:/WINNT/SYSTEM32/SVCHOST.EXE (0) | SMALL_IMAGE_SIZE<br>SURVIVE_REBOOT |
| node63 | C:/WINNT/SYSTEM32/MSTASK.EXE (0) | SURVIVE_REBOOT |
| node64 | C:/WINNT/SYSTEM32/SPOOLSV.EXE (0) | SMALL_IMAGE_SIZE<br>SURVIVE_REBOOT |
| node65 | C:/WINNT/SYSTEM32/SVCHOST.EXE (704) | MALWARE_ACTION<br>SMALL_IMAGE_SIZE<br>WINDOW_NOT_VISIBLE<br>SURVIVE_REBOOT<br>ACTION_USED_NETWORK<br>IS_SPAWNER |

TABLE J (graph edges of computer infected with the malware "Nuclearrat")

| | |
|---|---|
| node19->node46 | INSTANCE_OF |
| node46->node13 | INSTALL |
| node46->node52 | SPAWN |
| node46->node7 | SPAWN |
| node45->node38 | INSTANCE_OF |
| node38->node22 | SPAWN |
| node38->node55 | SPAWN |
| node38->node32 | SPAWN |
| node38->node9 | SPAWN |
| node5->node31 | INSTANCE_OF |
| node61->node60 | INSTANCE_OF |
| node25->node40 | INSTANCE_OF |
| node2->node16 | INSTANCE_OF |
| node1->node30 | INSTANCE_OF |
| node6->node34 | INSTANCE_OF |
| node35->node33 | INSTANCE_OF |
| node33->node12 | REGISTER |
| node33->node46 | SPAWN |
| node33->node40 | SPAWN |
| node33->node30 | SPAWN |
| node33->node34 | SPAWN |
| node33->node20 | SPAWN |
| node33->node11 | SPAWN |
| node13->node52 | INSTANCE_OF |
| node52->node31 | SPAWN |
| node52->node31 | CODE_INJECT |
| node52->node4 | INSTALL |
| node52->node13 | REGISTER |
| node24->node7 | INSTANCE_OF |
| node24->node20 | INSTANCE_OF |
| node24->node22 | INSTANCE_OF |
| node24->node55 | INSTANCE_OF |
| node24->node11 | INSTANCE_OF |
| node22->node18 | SPAWN |
| node22->node28 | SPAWN |
| node55->node47 | SPAWN |
| node11->node38 | SPAWN |
| node3->node10 | INSTANCE_OF |
| node41->node21 | INSTANCE_OF |
| node63->node49 | INSTANCE_OF |
| node17->node18 | INSTANCE_OF |
| node15->node47 | INSTANCE_OF |
| node15->node28 | INSTANCE_OF |
| node48->node39 | INSTANCE_OF |
| node14->node27 | INSTANCE_OF |
| node27->node16 | SPAWN |
| node27->node49 | SPAWN |
| node27->node39 | SPAWN |
| node27->node8 | SPAWN |
| node27->node56 | SPAWN |
| node27->node36 | SPAWN |
| node27->node65 | SPAWN |
| node27->node58 | SPAWN |
| node51->node26 | INSTANCE_OF |
| node26->node10 | SPAWN |
| node26->node43 | SPAWN |
| node64->node8 | INSTANCE_OF |
| node62->node56 | INSTANCE_OF |
| node62->node36 | INSTANCE_OF |
| node62->node65 | INSTANCE_OF |
| node65->node54 | SPAWN |
| node50->node58 | INSTANCE_OF |
| node29->node43 | INSTANCE_OF |
| node43->node21 | SPAWN |

TABLE J-continued (graph edges of computer infected with the malware "Nuclearrat")

| | |
|---|---|
| node43->node27 | SPAWN |
| node53->node54 | INSTANCE_OF |
| node37->node32 | INSTANCE_OF |
| node44->node9 | INSTANCE_OF |
| node57->node59 | INSTANCE_OF |
| node59->node60 | SPAWN |
| node23->node42 | INSTANCE_OF |
| node42->node26 | SPAWN |

TABLE K (graph nodes related to the malware "Nuclearrat")

| | | |
|---|---|---|
| node1 | C:/WINNT/NR/EXAMPLE.DLL (0) | TO_BE_CLEANED |
| node2 | C:/WINNT/SYSTEM32/CMD.EXE (1028) | TO_BE_CLEANED<br>IS_SPAWNER<br>IS_TERMINATED<br>HAS_SHORTCUT_IN_START_MENU |
| node3 | C:/WINNT/NR/EXAMPLE.EXE (0) | SUFFICIENT<br>SURVIVE_REBOOT<br>TO_BE_CLEANED |
| node4 | C:/DOCUMENTS AND SETTINGS/ADMINISTRATOR/DESKTOP/<br>TROJANEXECUTABLES/NUCLEARRATALL.EXE (0) | SUFFICIENT<br>TO_BE_CLEANED |
| node5 | C:/PROGRAM FILES/INTERNET EXPLORER/IEXPLORE.EXE (1004) | TO_BE_CLEANED<br>ACTION_USED_NETWORK<br>IS_TERMINATED<br>MALWARE_ACTION<br>WINDOW_NOT_VISIBLE<br>TAINTED_MALWARE<br>PROCESS_MEMORY_COMPROMISED<br>PARENT_SURVIVED_REBOOT |
| node6 | C:/DOCUMENTS AND SETTINGS/ADMINISTRATOR/DESKTOP/<br>TROJANEXECUTABLES/NUCLEARRATALL.EXE (376) | SUFFICIENT<br>TO_BE_CLEANED<br>IS_SPAWNER<br>IS_TERMINATED<br>CONFIRMED_MALWARE<br>WRITES_TO_WINDIR<br>WINDOW_NOT_VISIBLE<br>ALERTED_MALWARE |
| node7 | C:/WINNT/NR/EXAMPLE.EXE:1000 (1000) | SUFFICIENT<br>WRITES_TO_REGISTRY_STARTUP<br>SURVIVE_REBOOT<br>TO_BE_CLEANED<br>IS_SPAWNER<br>IS_TERMINATED<br>P2P_CODE_INJECTION<br>MALWARE_ACTION<br>CONFIRMED_MALWARE<br>WRITES_TO_WINDIR<br>WINDOW_NOT_VISIBLE<br>ALERTED_MALWARE |
| node8 | C:/WINNT/SYSTEM32/CMD.EXE (0) | |
| node9 | C:/PROGRAM FILES/INTERNET EXPLORER/IEXPLORE.EXE (0) | |
| node10 | C:/WINNT/EXPLORER.EXE (896) | SUFFICIENT<br>WRITES_TO_REGISTRY_STARTUP<br>IS_SPAWNER<br>INSTALLS_TOOLBAR |

TABLE L (graph edges of the malware "Nuclearrat")

| | |
|---|---|
| node4->node6 | INSTANCE_OF |
| node6->node3 | INSTALL |
| node6->node7 | SPAWN |
| node6->node2 | SPAWN |
| node9->node5 | INSTANCE_OF |
| node10->node6 | SPAWN |
| node3->node7 | INSTANCE_OF |
| node7->node5 | SPAWN |
| node7->node5 | CODE_INJECT |
| node7->node1 | INSTALL |
| node7->node3 | REGISTER |
| node8->node2 | INSTANCE_OF |

Figure 5:
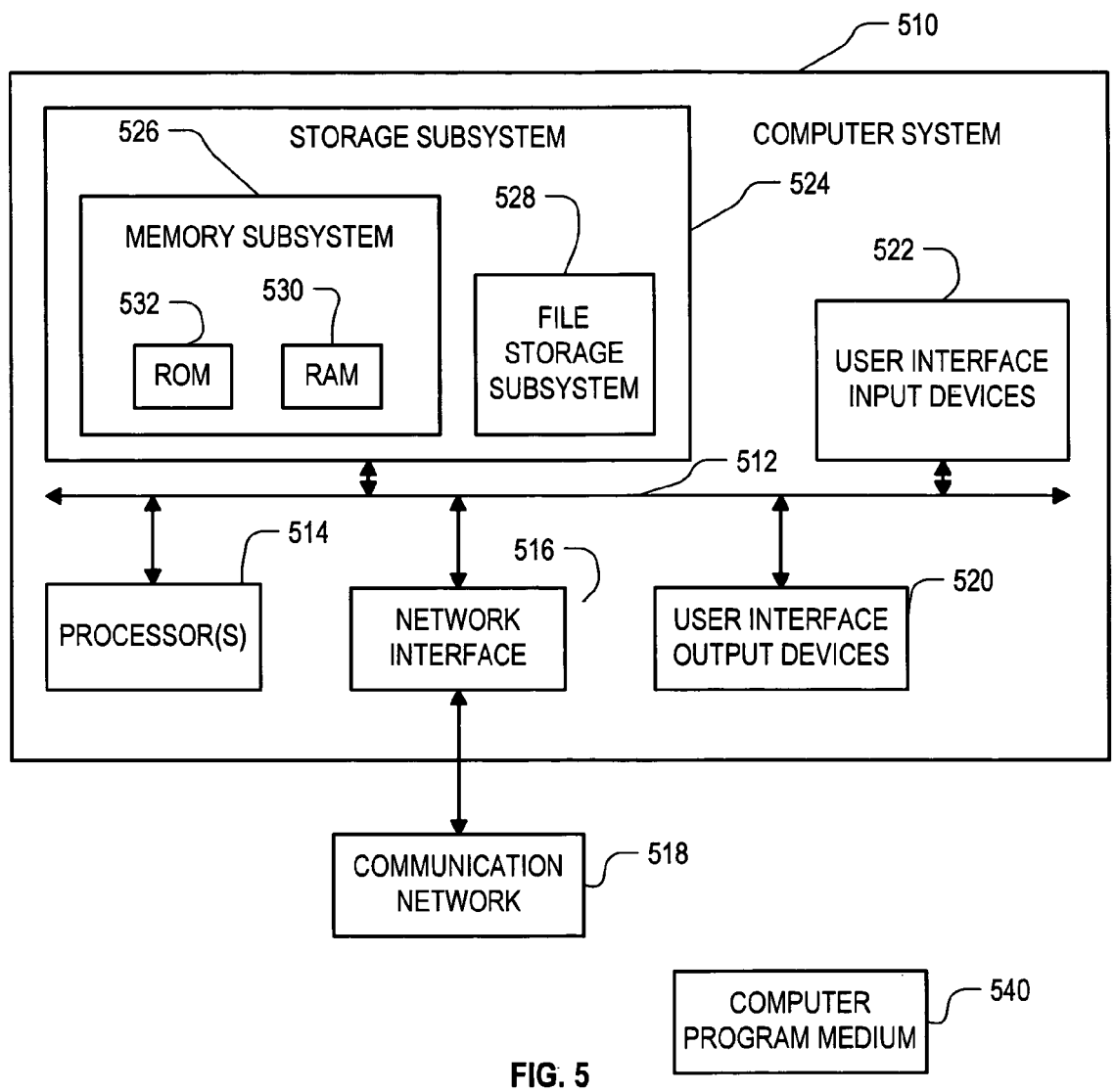
FIG. 5 shows an example computer apparatus and computer code medium that are embodiments of the invention.

FIG. 5 is a simplified block diagram of a computer system 510 suitable for use with embodiments of the present invention. Computer system 510 typically includes at least one processor 514 which communicates with a number of peripheral devices via bus subsystem 512. These peripheral devices may include a storage subsystem 524, comprising a memory subsystem 526 and a file storage subsystem 528, user interface input devices 522, user interface output devices 520, and a network interface subsystem 516. The input and output devices allow user interaction with computer system 510. Network interface subsystem 516 provides an interface to outside networks, including an interface to communication network 518, and is coupled via communication network 518 to corresponding interface devices in other computer systems. Communication network 518 may comprise many interconnected computer systems and communication links. These communication links may be wireline links, optical links, wireless links, or any other mechanisms for communication of information. While in one embodiment, communication network 518 is the Internet, in other embodiments, communication network 518 may be any suitable computer network.

User interface input devices 522 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 510 or onto computer network 518.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores the basic programming and data constructs that provide the functionality of certain embodiments of the present invention. For example, the various modules implementing the functionality of certain embodiments of the invention may be stored in storage subsystem 524. These software modules are generally executed by processor 514.

Memory subsystem 526 typically includes a number of memories including a main random access memory (RAM) 530 for storage of instructions and data during program execution and a read only memory (ROM) 532 in which fixed instructions are stored. File storage subsystem 528 provides persistent storage for program and data files, and may include a hard disk drive, a floppy disk drive along with associated removable media, a CD-ROM drive, an optical drive, or removable media cartridges. The databases and modules implementing the functionality of certain embodiments of the invention may be stored by file storage subsystem 528.

Bus subsystem 512 provides a mechanism for letting the various components and subsystems of computer system 510 communicate with each other as intended. Although bus subsystem 512 is shown schematically as a single bus, alternative embodiments of the bus subsystem may use multiple busses.

Computer program medium 540 can be a medium associated with file storage subsystem 528, and/or with network interface 516. The computer medium readable medium has code for performing methods described herein.

Computer system 510 itself can be of varying types including a personal computer, a portable computer, a workstation, a computer terminal, a network computer, a television, a mainframe, or any other data processing system or user device. Due to the ever-changing nature of computers and networks, the description of computer system 510 depicted in FIG. 5 is intended only as a specific example for purposes of illustrating the preferred embodiments of the present invention. Many other configurations of computer system 510 are possible having more or less components than the computer system depicted in FIG. 5.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims. Various method steps can occur at least partly simultaneously and/or at least partly contemporaneously.

What is claimed is:

1. A method of protection from harmful software on a computer, comprising:

using a graph rule processor, tracking a set of one or more relationships based upon the occurrence of one or more events among a plurality of nodes, the plurality of nodes representing:

a set of one or more processes on the computer and a set of one or more files on the computer, wherein the set of one or more relationships includes:

a first subset of one or more relationships among at least one process of the set of one or more processes and at least one file of the set of one or more files, wherein said first subset of one or more relationships excludes instance of-type relationships;

modifying a set of one or more characteristics based upon the set of one or more relationships;

tracking the set of one or more characteristics at each node of the plurality of nodes, wherein the set of one or more characteristics is passed around a graph;

based at least on a change in the set of characteristics, classifying as to be cleaned, at the computer, at least one node of the plurality of nodes;

comparing the at least one node to be cleaned against a plurality of rules, each of the plurality of rules comprising a condition and an action for each relationship;

based upon the comparison of the at least one node to be cleaned, classifying the at least one node to be cleaned as change and placing the node in a node change queue for processing by the graph rule processor;

determining a score for the at least one changed node, wherein the score is based upon one or more potentially malicious actions the at least one changed node has performed;

if the determined score satisfies a score trigger, classifying the at least one changed node as harmful software; and removing, at runtime, effects of the harmful software from the computer.

2. The method of clam 1, wherein said classifying is further based on at least autonomous action by the computer, including said tracking.

3. The method of claim 1, wherein said classifying is further based at least on receiving, at the computer, input from a user of the computer classifying as harmful software at least one node of the plurality of nodes.

4. The method of claim 1, further comprising:
reversing configuration changes made to the computer by the harmful software.

5. The method of claim 1, further comprising:
restoring configuration parts of the computer affected by the harmful software to system defaults.

6. The method of claim 1, wherein said removing includes:
removing files associated with the harmful software from the computer.

7. The method of claim 1, wherein said removing includes:
removing processes associated with the harmful software from the computer.

8. The method of claim 1, wherein said method occurs independent of the computer receiving a security update subsequent to installation of code performing the method, the security update being generated specifically for the harmful software by a security vendor of the code performing the method.

9. The method of claim 1, wherein said tracking the set of one or more relationships and said tracking the set of one or more characteristics includes tracking changes made by the set of one or more processes and the set of one or more files with approval by a user of the computer, and said classifying and said removing occur despite the approval by the user.

10. The method of claim 1, wherein said set of one or more relationships further includes:
   another subset of one or more relationships among at least one process of the set of one or more processes and at least one file of the set of one or more files, wherein said another subset of one or more relationships are instance of-type relationships.

11. The method of claim 1, wherein said set of one or more relationships further includes:
   another subset of one or more relationships among at least two processes of the plurality of processes.

12. The method of claim 1, wherein said set of one or more relationships further includes:
   another subset of one or more relationships among at least two files of the plurality of files.

13. The method of claim 1, wherein said set of one or more relationships further includes:
   a second subset of one or more relationships among at least one process of the set of one or more processes and at least one file of the set of one or more files, wherein said another subset of one or more relationships are instance of-type relationships;
   a third subset of one or more relationships among at least two processes of the plurality of processes; and
   a fourth subset of one or more relationships among at least two files of the plurality of files.

14. The method of claim 1, wherein changes to said set of one or more characteristics at said each node on a first end of the set of one or more relationships are controlled by: the set of one or more relationships, and said set of one or more characteristics at said each node on a second end of the set of one or more relationships.

15. The method of claim 1, wherein changes to said set of one or more characteristics at said each node on a first end of the set of one or more relationships are controlled by: the set of one or more relationships, said set of one or more characteristics at said each node on a second end of the set of one or more relationships,
   wherein said changes are determined iteratively.

16. The method of claim 1, wherein at least one of the plurality of relationships has a set of one or more rules that control how one or more changes in at least one of the characteristics of a first subset of the nodes affects at least one of the characteristics of a second set of nodes related to the first set of nodes.

17. The method of claim 1, wherein at least one of the plurality of relationships has a set of one or more rules that control how one or more changes in at least one of the characteristics of a first subset of the nodes affects at least one of the characteristics of a second set of nodes related to the first set of nodes,
   wherein the set of one or more rules is extensible.

18. The method of claim 1, wherein the set of one or more characteristics is extensible.

19. The method of claim 1, wherein the set of one or more characteristics of at least one of the files is defined by one or more properties of said at least one of the files.

20. The method of claim 1, wherein the set of one or more characteristics of at least one of the processes is defined by one more properties of said at least one of the processes.

21. The method of claim 1, wherein the set of one or more characteristics of at least one of the files is defined by at least one action performed on said at least one of the files.

22. The method of claim 1, wherein the set of one or more characteristics of at least one of the processes is defined by at least one action performed by said at least one of the processes.

23. The method of claim 1, wherein the set of one or more characteristics of at least one of the nodes is defined by at least one rule for at least one relationship between said at least one of the nodes and at least one related node.

24. The method of claim 1, wherein said removing is performed despite an absence of uninstall capability by the harmful software.

25. A computer having a method of protection from harmful software on the computer, comprising:
   the computer having the method, the method including:
   using a graph rule processor, tracking a set of one or more relationships based upon the occurrence of one or more events among a plurality of nodes, the plurality of nodes representing:
   a set of one or more processes on the computer and a set of one or more files on the computer, wherein the set of one or more relationships includes:
      a first subset of one or more relationships among at least one process of the set of one or more processes and at least one file of the set of one or more files, wherein said first subset of one or more relationships excludes instance of-type relationships;
   modifying a set of one or more characteristics based upon the set of one or more relationships;
   tracking the set of one or more characteristics at each node of the plurality of nodes, wherein the set of one or more characteristics is passed around a graph;
   based at least on a change in the set of characteristics, classifying as to be cleaned, at the computer, at least one node of the plurality of nodes;
   comparing the at least one node to be cleaned against a plurality of rules, each of the plurality of rules comprising a condition and an action for each relationship;
   based upon the comparison of the at least one node to be cleaned, classifying the at least one node to be cleaned as change and placing the node in a node change queue for processing by the graph rule processor;
   determining a score for the at least one changed node, wherein the score is based upon one or more potentially malicious actions the at least one changed node has performed;
   if the determined score satisfies a score trigger, classifying the at least one changed node as harmful software; and
   removing, at runtime, effects of the harmful software from the computer.

26. A non-transitory computer readable storage medium having a method of protection from harmful software on a computer, comprising:
   the computer readable storage medium operably connected to a graph rule processor and having the method, the method including instructions for causing the graph rule processor to:
   track a set of one or more relationships based upon the occurrence of one or more events among a plurality of nodes, the plurality of nodes representing:

a set of one or more processes on the computer and a set of one or more files on the computer, wherein the set of one or more relationships includes:
  a first subset of one or more relationships among at least one process of the set of one or more processes and at least one file of the set of one or more files, wherein said first subset of one or more relationships excludes instance of-type relationships;
modify a set of one or more characteristics based upon the set of one or more relationships;
track the set of one or more characteristics at each node of the plurality of nodes, wherein the set of one or more characteristics is passed around a graph;
based at least on a change in the set of one or more characteristics, classify as to be cleaned, at the computer, at least one node of the plurality of nodes;
compare the at least one node to be cleaned against a plurality of rub rules, each of the plurality of rules comprising a condition and an action for reach relationship;
based upon the comparison of the at least one node to be cleaned, classify the at least one node to be cleaned as changed and placing the node in a node change queue for processing by the graph rule processor;
determining a score for the at least one changed node, wherein the score is based upon one or more potentially malicious actions the at least one changed node has performed;
if the determined score satisfies a score trigger, classify the at least one changed node as harmful software; and
remove, at runtime, effects of the harmful software from the computer.

\* \* \* \* \*